United States Patent
Lee et al.

(10) Patent No.: US 9,710,148 B2
(45) Date of Patent: Jul. 18, 2017

(54) MOBILE TERMINAL AND CONTROLLING METHOD THEREOF

(75) Inventors: Choongryeol Lee, Gwangunyeong-si (KR); Byongdoo Oh, Hwaseong-si (KR)

(73) Assignee: LG ELECTRONICS INC., Seoul (KR)

( * ) Notice: Subject to any disclaimer, the term of this patent is extended or adjusted under 35 U.S.C. 154(b) by 1280 days.

(21) Appl. No.: 13/018,072

(22) Filed: Jan. 31, 2011

(65) Prior Publication Data

US 2012/0110496 A1    May 3, 2012

(30) Foreign Application Priority Data

Oct. 29, 2010 (KR) .................. 10-2010-0106759

(51) Int. Cl.
| | |
|---|---|
| G06F 3/0488 | (2013.01) |
| G06F 9/44 | (2006.01) |
| H04M 1/725 | (2006.01) |

(52) U.S. Cl.
CPC .......... G06F 3/0488 (2013.01); G06F 9/4443 (2013.01); H04M 1/72522 (2013.01)

(58) Field of Classification Search
CPC ............ G06F 9/45537; G06F 9/45554; G06F 2009/4557; G06F 2009/45595; G06F 9/45533; G06F 9/4856; G06F 2212/152; G06F 12/109; G06F 21/566; G06F 3/0647
USPC ................................. 715/733, 778
See application file for complete search history.

(56) References Cited

U.S. PATENT DOCUMENTS

| | | | |
|---|---|---|---|
| 6,928,542 B2 * | 8/2005 | Wen et al. ................. 713/2 |
| 7,788,593 B1 | 8/2010 | Grechishkin et al. | |
| 8,201,170 B2 * | 6/2012 | Lescouet et al. ............ 718/100 |
| 8,214,768 B2 * | 7/2012 | Boule et al. .................. 715/863 |
| 8,468,455 B2 * | 6/2013 | Jorgensen et al. ............ 715/733 |
| 2004/0205755 A1 * | 10/2004 | Lescouet ............... G06F 9/4843 |
| | | | 718/100 |
| 2006/0010314 A1 | 1/2006 | Xu | |
| 2006/0010433 A1 | 1/2006 | Neil | |
| 2007/0162901 A1 | 7/2007 | Oh | |
| 2008/0318616 A1 | 12/2008 | Chipalkatti et al. | |
| 2010/0064245 A1 | 3/2010 | Smith et al. | |
| 2011/0126139 A1 * | 5/2011 | Jeong .................... G06F 3/0482 |
| | | | 715/767 |

(Continued)

FOREIGN PATENT DOCUMENTS

| | | |
|---|---|---|
| CN | 101349976 A | 1/2009 |
| KR | 10-2007-0094167 A | 9/2007 |

(Continued)

*Primary Examiner* — Jeffrey A Gaffin
*Assistant Examiner* — Mandrita Brahmachari
(74) *Attorney, Agent, or Firm* — Birch, Stewart, Kolasch & Birch, LLP

(57) ABSTRACT

A mobile terminal including a memory including at least first and second OSs (Operating Systems) and applications dedicated to each of the first and second OSs; a display unit configured to display a first OS (Operating System) dedicated screen including the applications dedicated to the first OS among the first and second OSs; and a controller configured to control the display unit to switch the displaying of the first OS dedicated screen to a displaying of a second OS dedicated screen if a switching command for switching the first OS dedicated screen to the second OS dedicated screen is input.

17 Claims, 35 Drawing Sheets

(56) References Cited

U.S. PATENT DOCUMENTS

2011/0209064 A1* 8/2011 Jorgensen ............. G06F 9/4445
715/733

FOREIGN PATENT DOCUMENTS

| KR | 10-2009-0094608 A | 9/2009 |
|---|---|---|
| WO | WO 2009/110654 A1 | 9/2009 |

* cited by examiner

FIG. 7
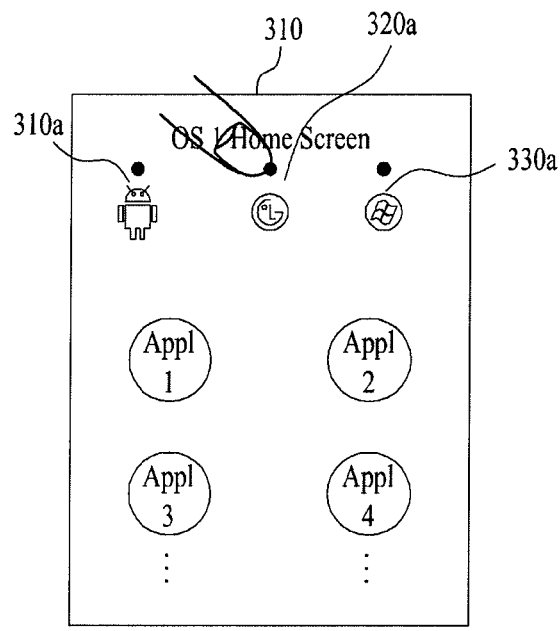
(a)
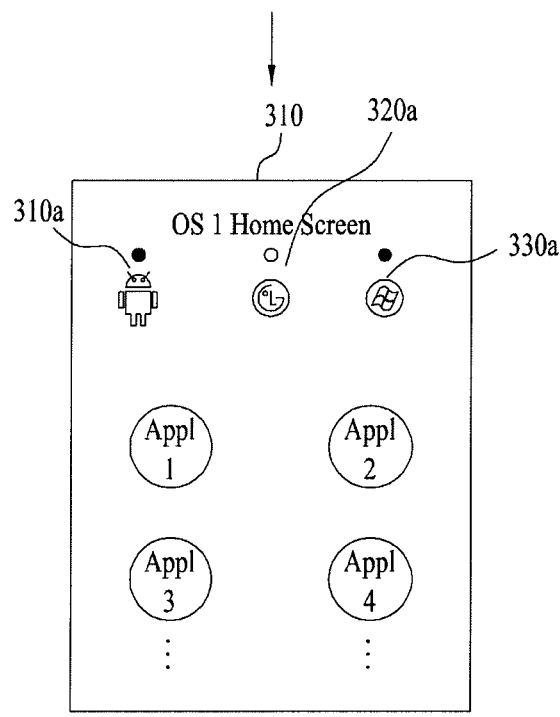
(b)

FIG. 17
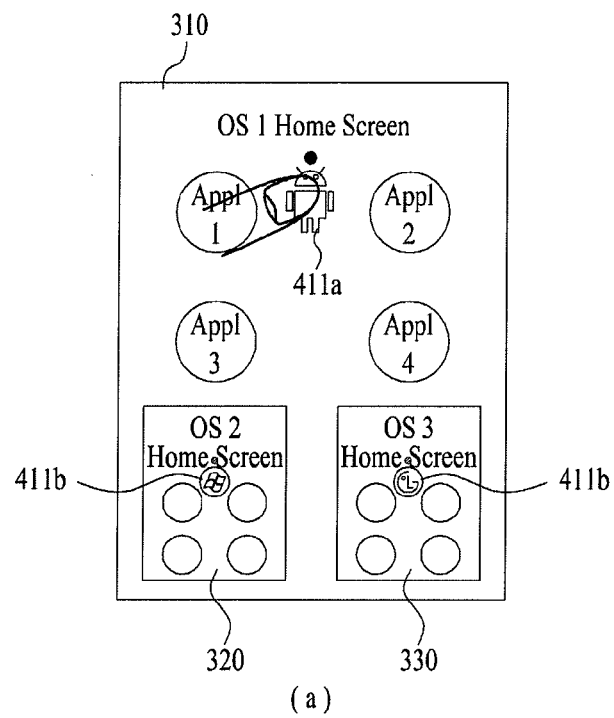
(a)
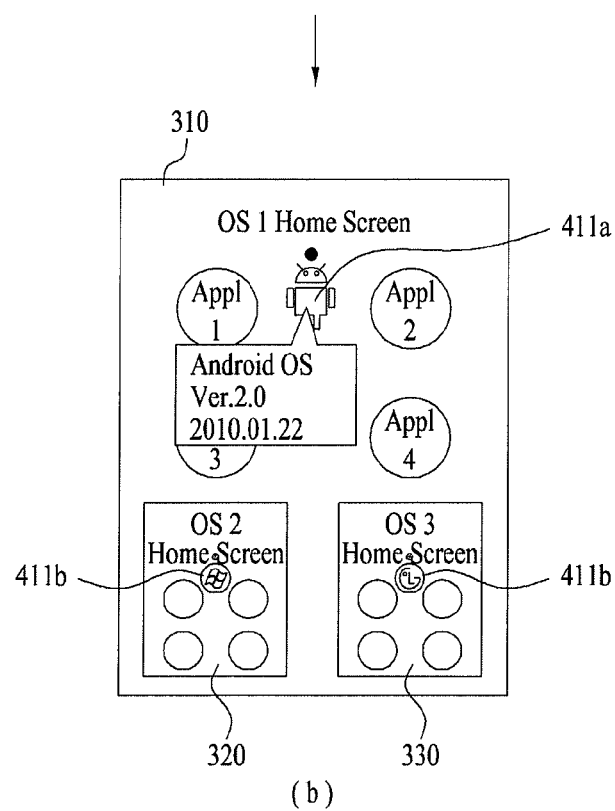
(b)

FIG. 21
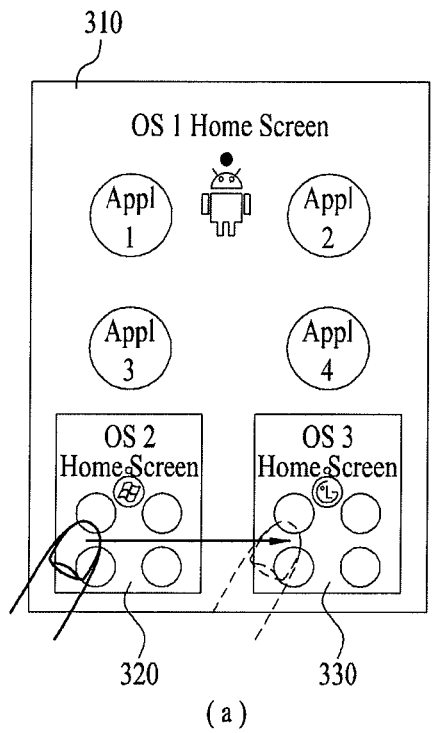
(a)
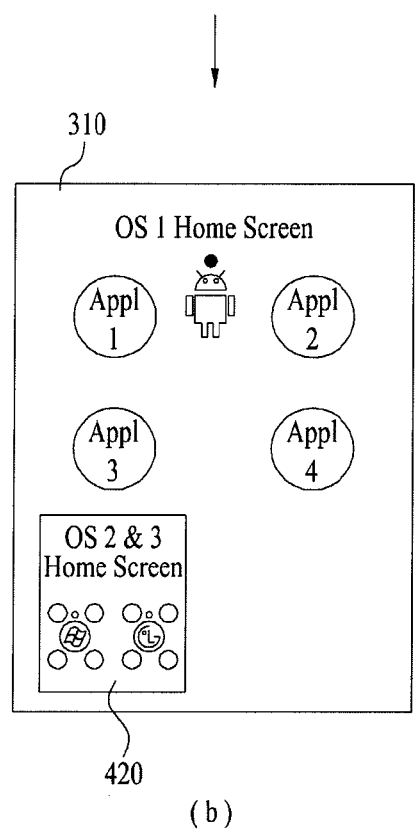
(b)

FIG. 22
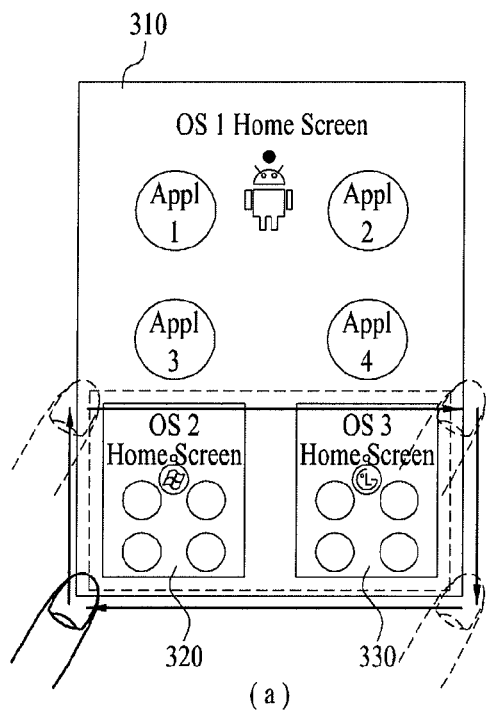
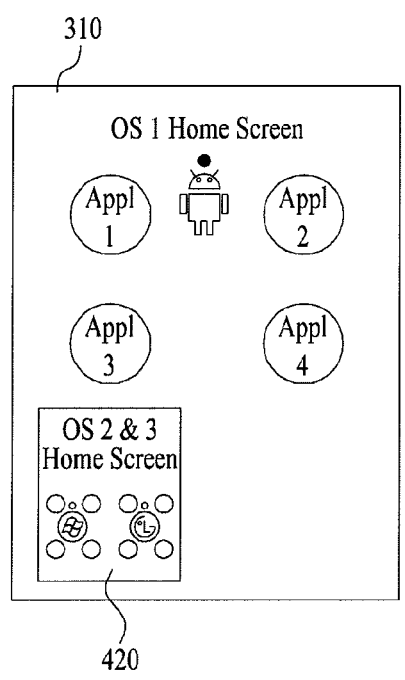

FIG. 23
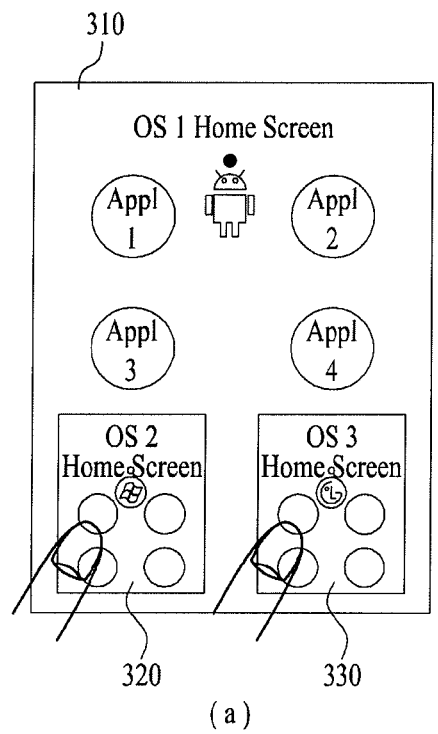
(a)
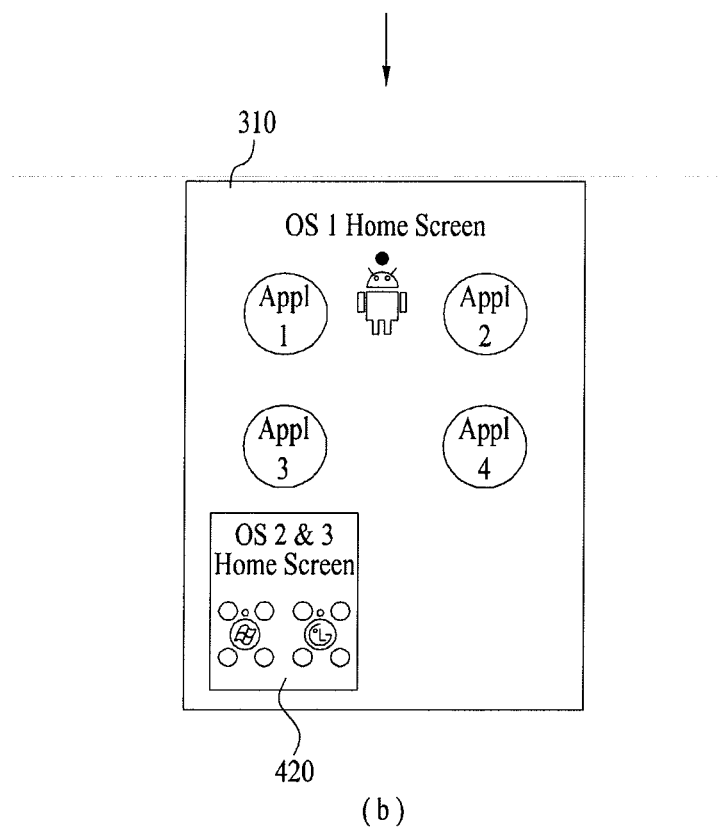
(b)

FIG. 24
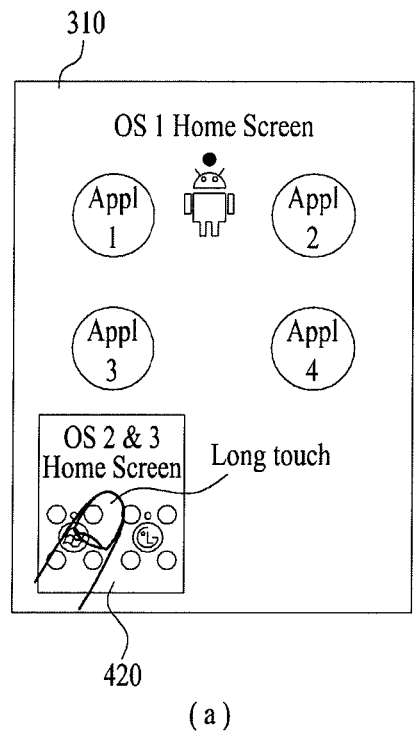
(a)
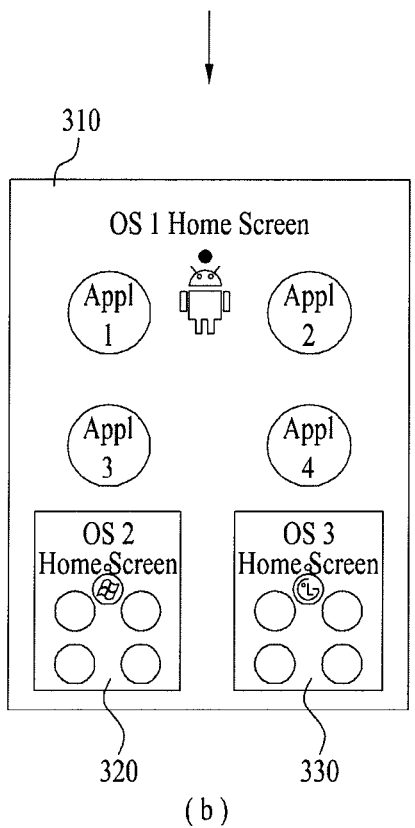
(b)

FIG. 25
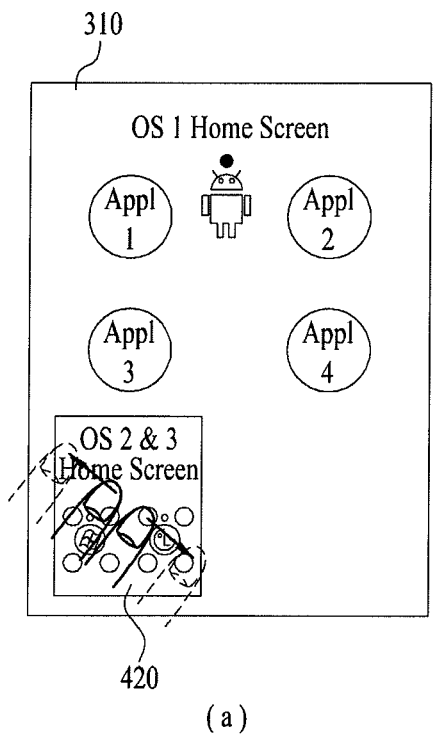
(a)
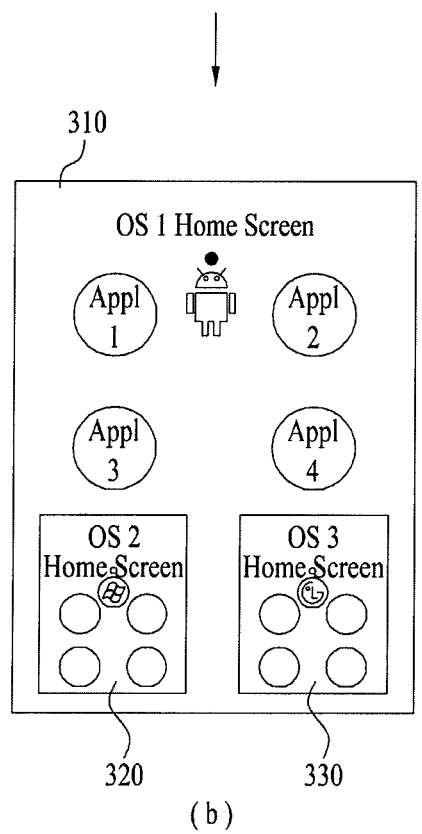
(b)

FIG. 30
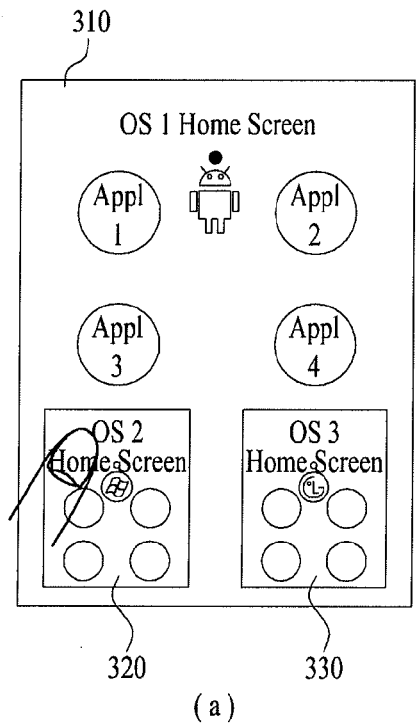
(a)
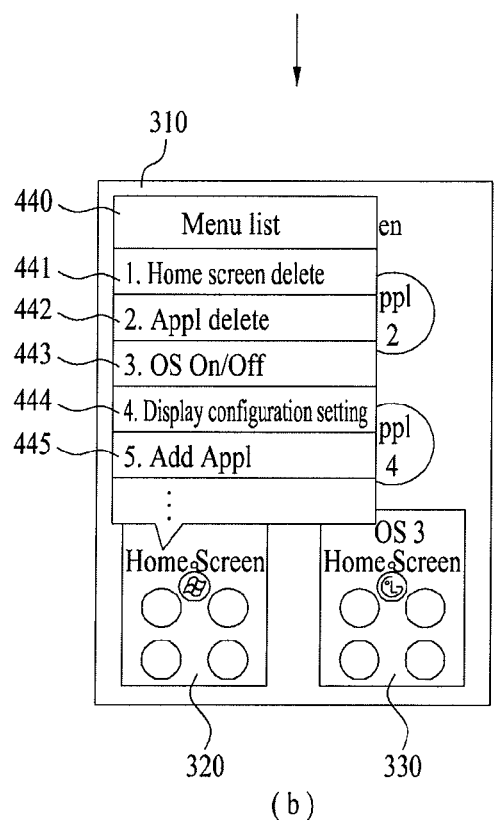
(b)

FIG. 31
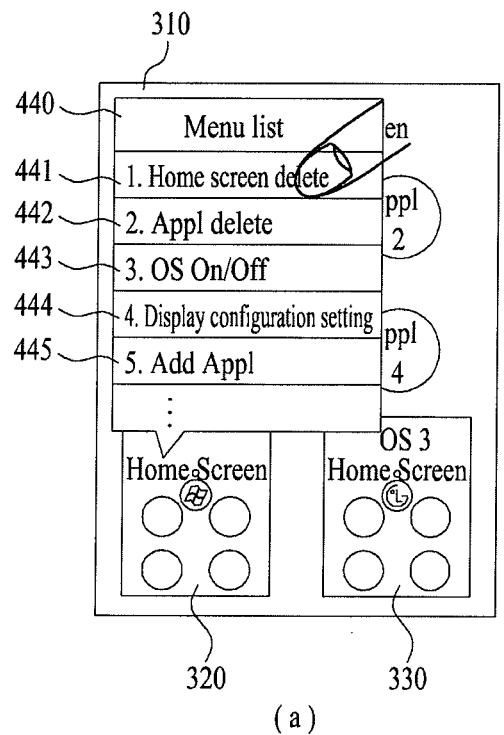
(a)
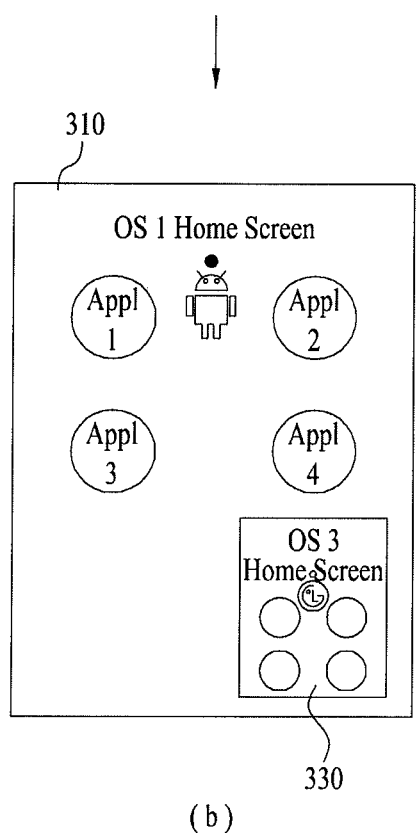
(b)

MOBILE TERMINAL AND CONTROLLING METHOD THEREOF

Pursuant to 35 U.S.C. §119(a), this application claims the benefit of earlier filing date and right of priority to Korean Application No. 10-2010-0106759, filed on Oct. 29, 2010, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

As mobile terminals for using such a multimedia service, various kinds of smart phones capable of executing various application functions are ongoing to be released.

Such a mobile terminal as a smart phone is loaded with an operating system (hereinafter abbreviated OS) for supporting executions of various applications, voice/data communications, interoperability with PC and the like.

Currently, operating systems loaded on smart phones include Android OS released by Google, Windows Mobile OS released by Microsoft, I-OS released by Apple and the like.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, in which at least two operating systems are provided and by which such screens respectively dedicated to the at least two operating systems as home screens can be displayed by being switched to each other.

Another object of the present invention is to provide a mobile terminal and controlling method thereof, in which at least two operating systems are provided and by which home screens respectively dedicated to the at least two operating systems can be displayed on a single screen.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a memory provided with at least two OSs (Operating Systems) and applications dedicated to each of the OSs, a display unit configured to display a first OS (Operating System) dedicated screen including applications dedicated to a first OS among the OSs, a controller controlling operations related to the OSs, wherein the controller configured to switch the first OS dedicated screen to a second OS dedicated screen if a command for switching the first OS dedicated screen to the second OS dedicated screen is inputted, and to display the second OS dedicated screen.

In another aspect of the present invention, a method of controlling a mobile terminal, which is provided with at least two OSs (Operating Systems) and applications dedicated to each of the at least two operating systems, includes the steps of displaying a first OS (Operating System) dedicated screen including the applications dedicated to a first OS among the OSs on a screen, detecting whether a command for switching the first OS dedicated screen to a second OS dedicated screen is inputted, switching the first OS dedicated screen to the second OS dedicated screen if the switching command is inputted, displaying the second OS dedicated screen.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIGS. 6 to 8 are diagrams of screen configurations of a process for displaying screens respectively dedicated to operating system in a manner of switching the dedicated screens to each other according to a first embodiment of the present invention;

FIG. 17 is a diagram of screen configurations of a process for displaying information indicating a corresponding OS on each dedicated screen per OS displayed together on a single screen according to an embodiment 2-4 of the present invention;

FIGS. 21 to 23 are diagrams of screen configurations of a process for unifying at least two OS dedicated screens into a new OS dedicated screen according to an embodiment 2-7 of the present invention;

FIG. 24 and FIG. 25 are diagrams of screen configurations of a process for separating the OS dedicated screen implemented by the process shown in FIGS. 21 to 23 into original screens according to an embodiment 2-7 of the present invention;

FIGS. 30 to 35 are diagrams of screen configurations of a process for controlling an operation of a specific one of OS dedicated screens displayed together within a single screen according to an embodiment 2-10 of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
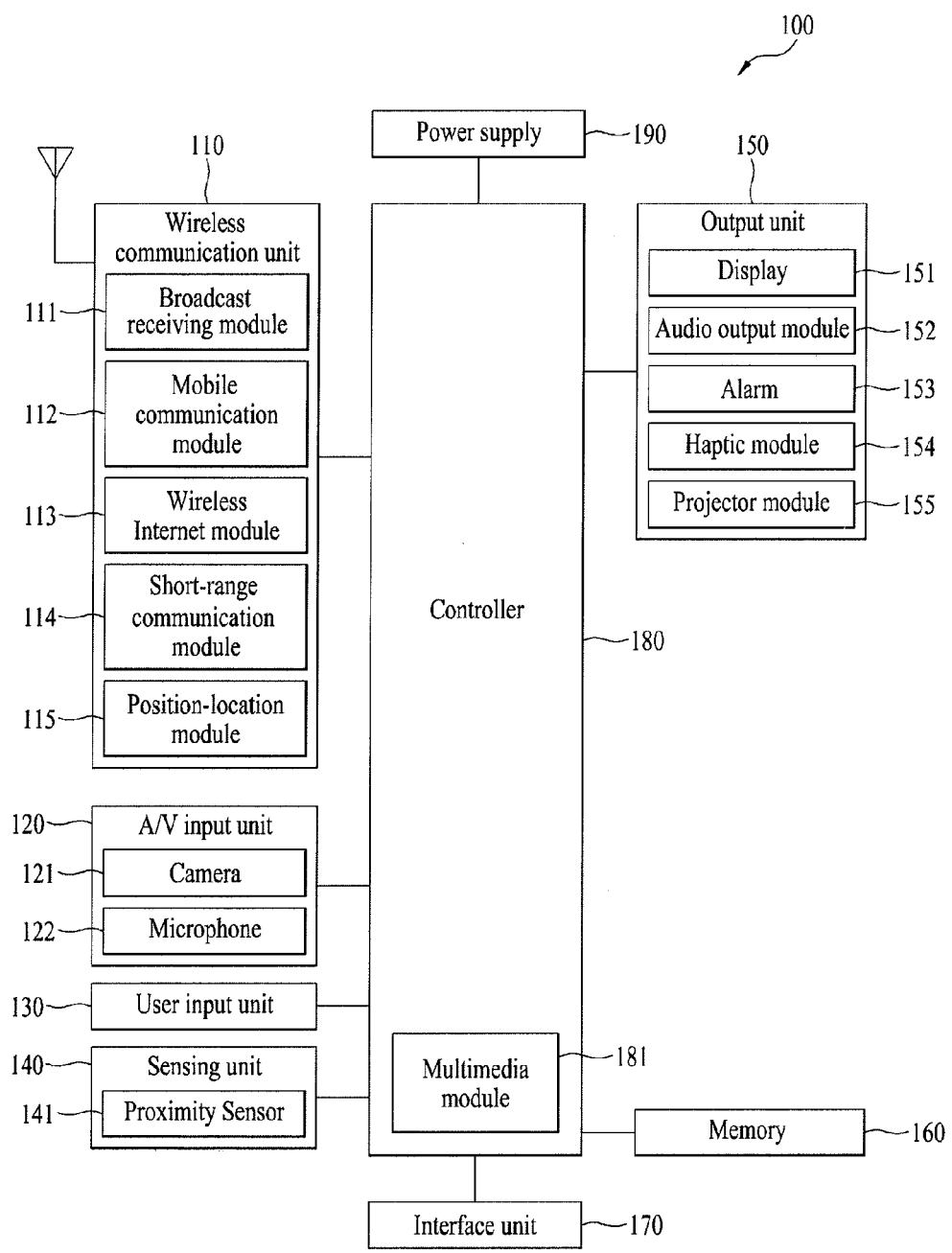
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122.

The camera 121 possesses a digital zoom and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

Moreover, the memory 160 is provided with a plurality of operating systems and applications dedicated to each of the operating systems. For instance, the operating systems can include Android based OS, Linux based OS, Windows Mobile based OS, Apple based OS and the like.

The operating systems are selectively drivable one by one or can be driven entirely and simultaneously, under the control of the controller 180.

The applications are driven according to a platform of each operating system. Each of the applications is provided to execute a specific function. And, the applications are displayed as icons on the screen. For instance, the applications provide various functions of compass, enhanced reality, camera, video player, music player, game, news, web browser and the like.

The applications can be provided as defaults in the memory 160 of the mobile terminal 100 or can be downloaded from a website or an external terminal.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

Figure 3:
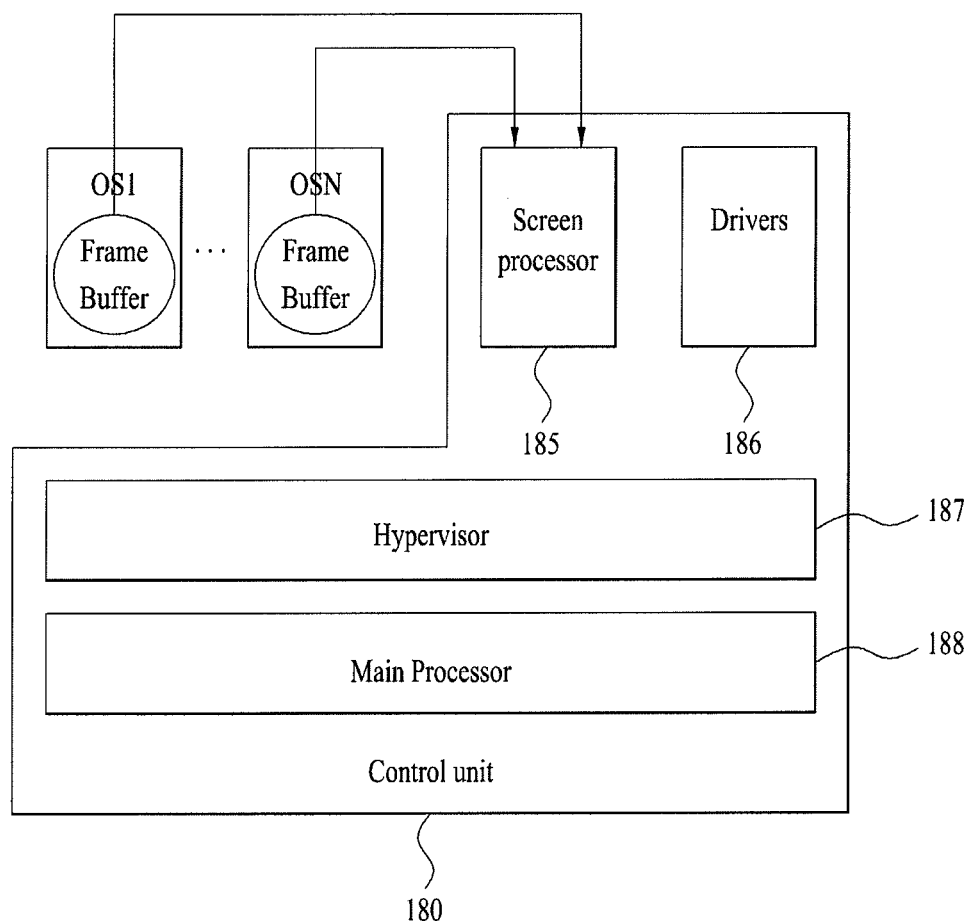
FIG. 3 is a block diagram of a control unit for driving multiple operating systems and displaying dedicated screens of all operating system within a single screen according to the present invention.
Figure 4:
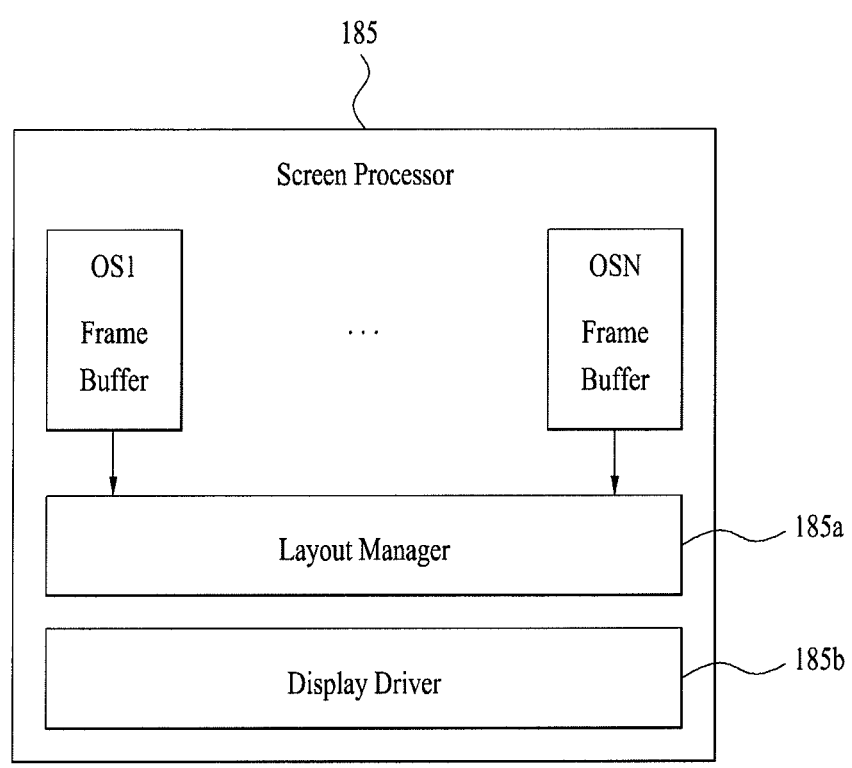
FIG. 4 is a block diagram of a screen processor shown in FIG. 3.

Moreover, the controller 180 is able to include components for driving at least two operating systems and components for performing operations related to dedicated screens of the driven operating systems, as shown in FIG. 3 and FIG. 4, according to the present invention.

FIG. 3 is a block diagram of a control unit for driving multiple operating systems and displaying dedicated screens of all operating system within a single screen according to the present invention.

FIG. 4 is a block diagram of a screen processor shown in FIG. 3.

Referring to FIG. 3 and FIG. 4, the controller 180 of the present invention includes a screen processor 185, a driver 186, a hypervisor 187 and a main processor 188.

Frame buffers are provided to all operating systems provided within the memory 160, respectively. If the operating systems are driven, the screen processor 185 receives frames corresponding to dedicated screens of the corresponding operating systems from the frame buffers of the operating systems, respectively. Under the control of the control of the main processor 188, the screen processor 185 then determines which one of the OS dedicated screens will be displayed on a current screen of the display unit 151.

In particular, under the control of the main processor 188, the screen processor 185 displays the dedicated screen of the specific operating system on a whole screen of the display unit 151. Alternatively, the screen processor 185 is able to generate one unified frame by combining or editing the frames received from the frame buffers. In this case, the unified frame includes a screen image containing all of the operating systems of the present invention.

The screen processor 185 includes a layout manager 185a and a display driver 185b. In particular, the layout manager 185a generates one unified frame by combining or editing the frames received from the frame buffers. And, the display driver 185b controls the frame generated by the layout manager 185a to b displayed on the display unit 151.

The driver 186 controls the entire operating systems to be driven.

The hypervisor 187 is a middleware between the main processor 188 and the operating systems and corresponds to a virtualization engine enabling a plurality of operating systems to be available for the mobile terminal 100 according to the present invention.

The main processor 188 controls overall operations related to the multiple OS driving according to the present invention.

The screen processor 185, the driver 186, the hypervisor 187 and the main processor 188 can be included in the controller 180. Alternatively, they can be provided as software within the memory 160.

In the following description, assume that the screen processor 185, the driver 186, the hypervisor 187 and the main processor 188 are unified together within the controller 180.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
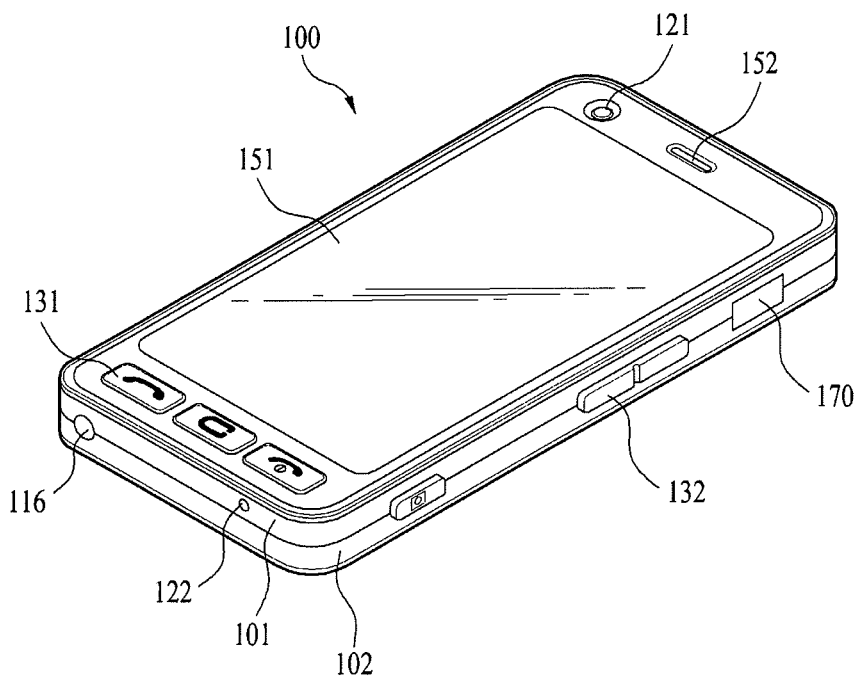
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
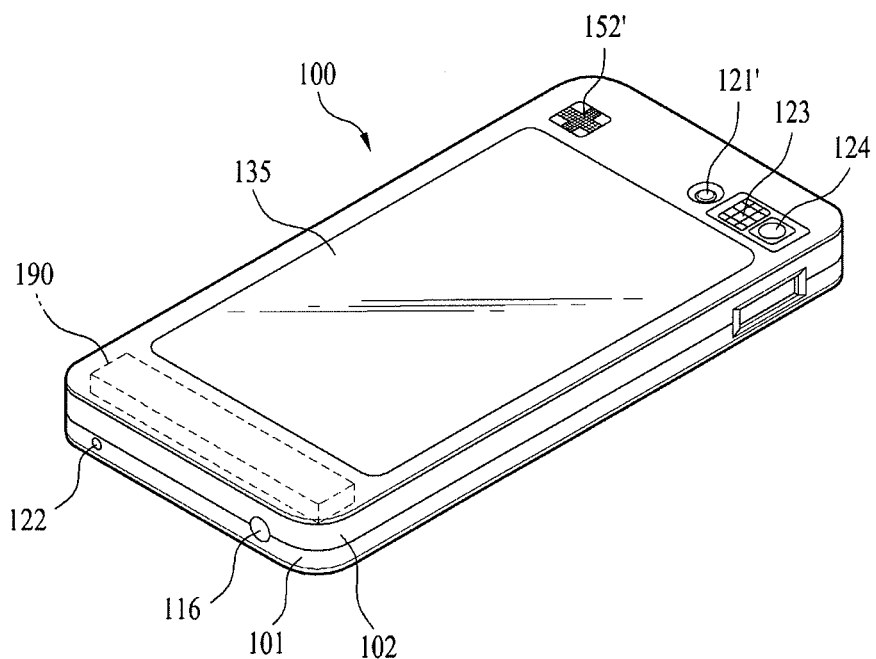
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, preferred embodiments of the present invention are explained with reference to FIGS. 5 to 35.

In case that at least two operating systems are provided, a first embodiment of the present invention relates to a process for displaying screens respectively dedicated to the operating systems on a screen in a manner of switching the OS dedicated screens to each other. And, a second embodiment of the present invention relates to a process for displaying all OS dedicated screens within a single screen together.

In the following description, a first embodiment of the present invention is described with reference to FIGS. 5 to 8.

First Embodiment

According to a first embodiment of the present invention, while a dedicated screen of a specific first OS of all operating systems is displayed, if a command for a OS dedicated screen switching is inputted by a user, the controller 180 of the mobile terminal 100 switches the first OS dedicated screen to a dedicated screen of a second OS and then displays the second OS dedicated screen.

Figure 5:
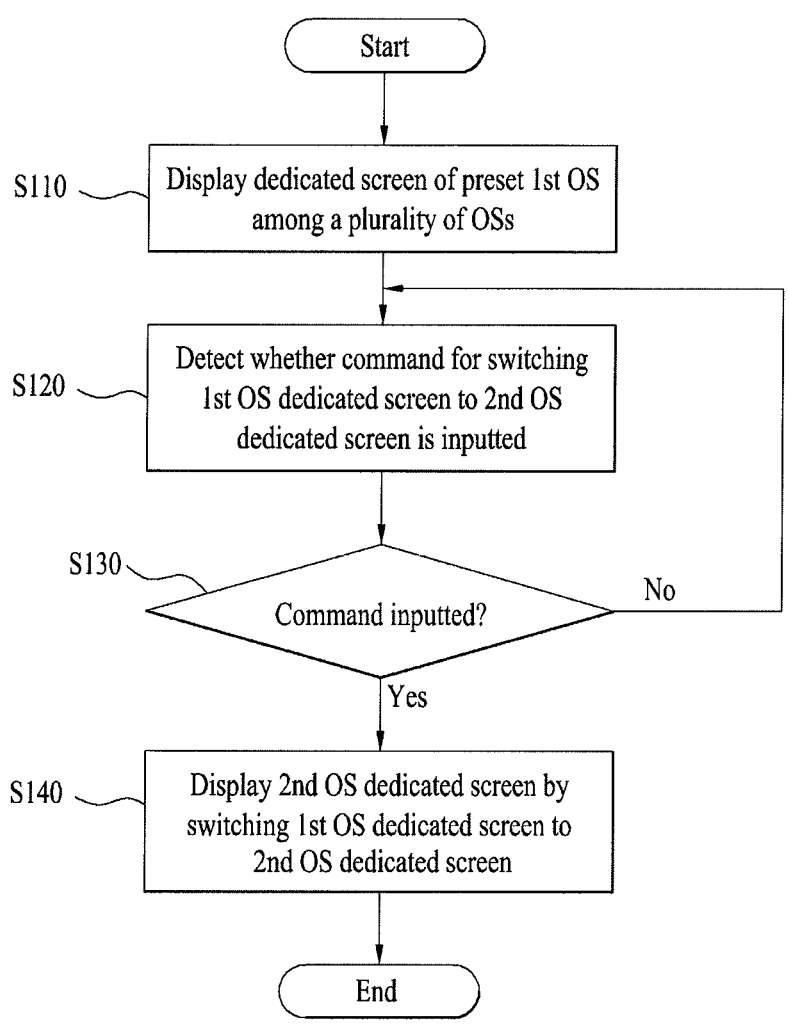
FIG. 5 is a flowchart of a process for displaying screens respectively dedicated to operating system in a manner of switching the dedicated screens to each other according to a first embodiment of the present invention.

FIG. 5 is a flowchart of a process for displaying screens respectively dedicated to operating system in a manner of switching the dedicated screens to each other according to a first embodiment of the present invention.

Figure 6:
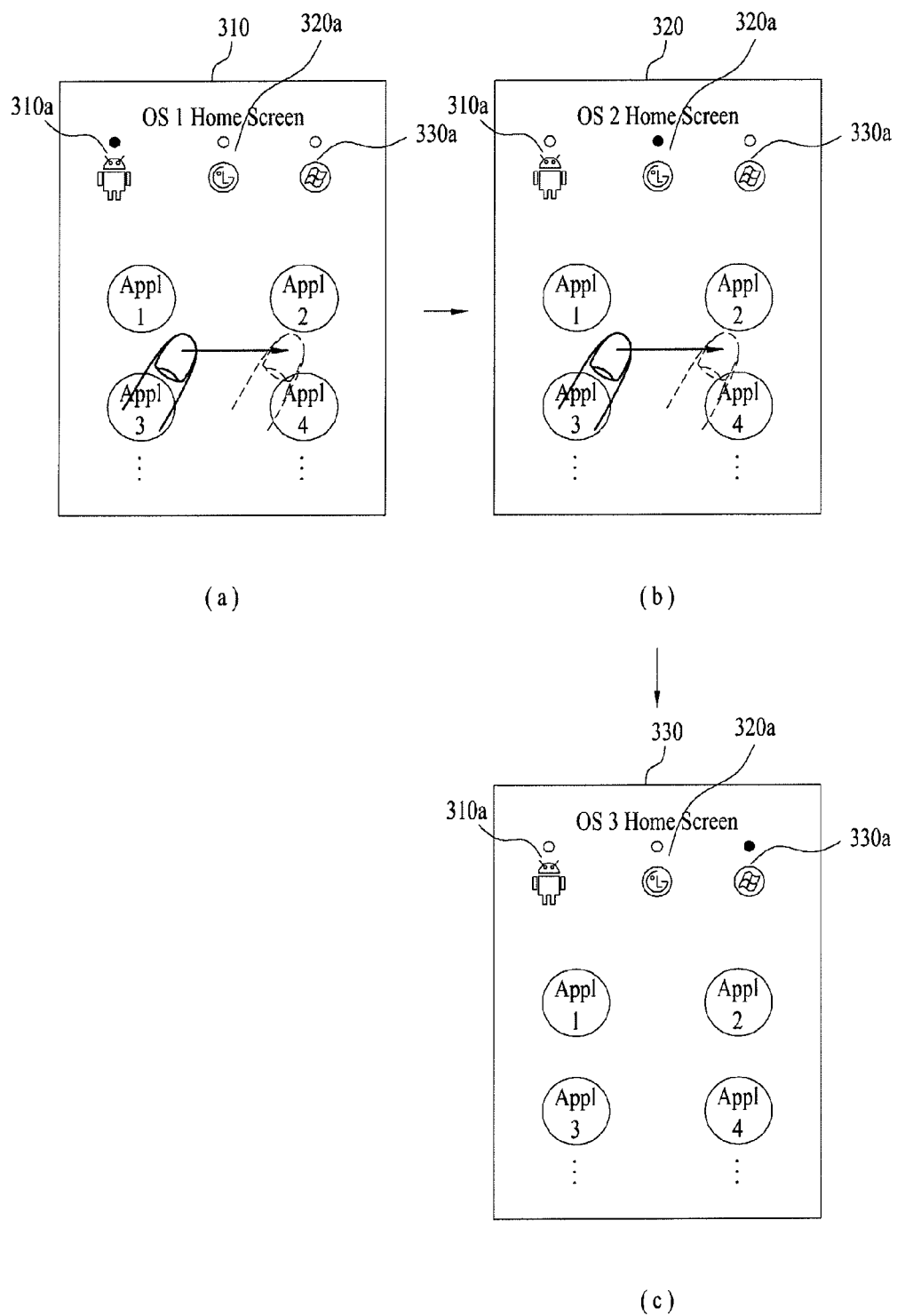
Figure 8:
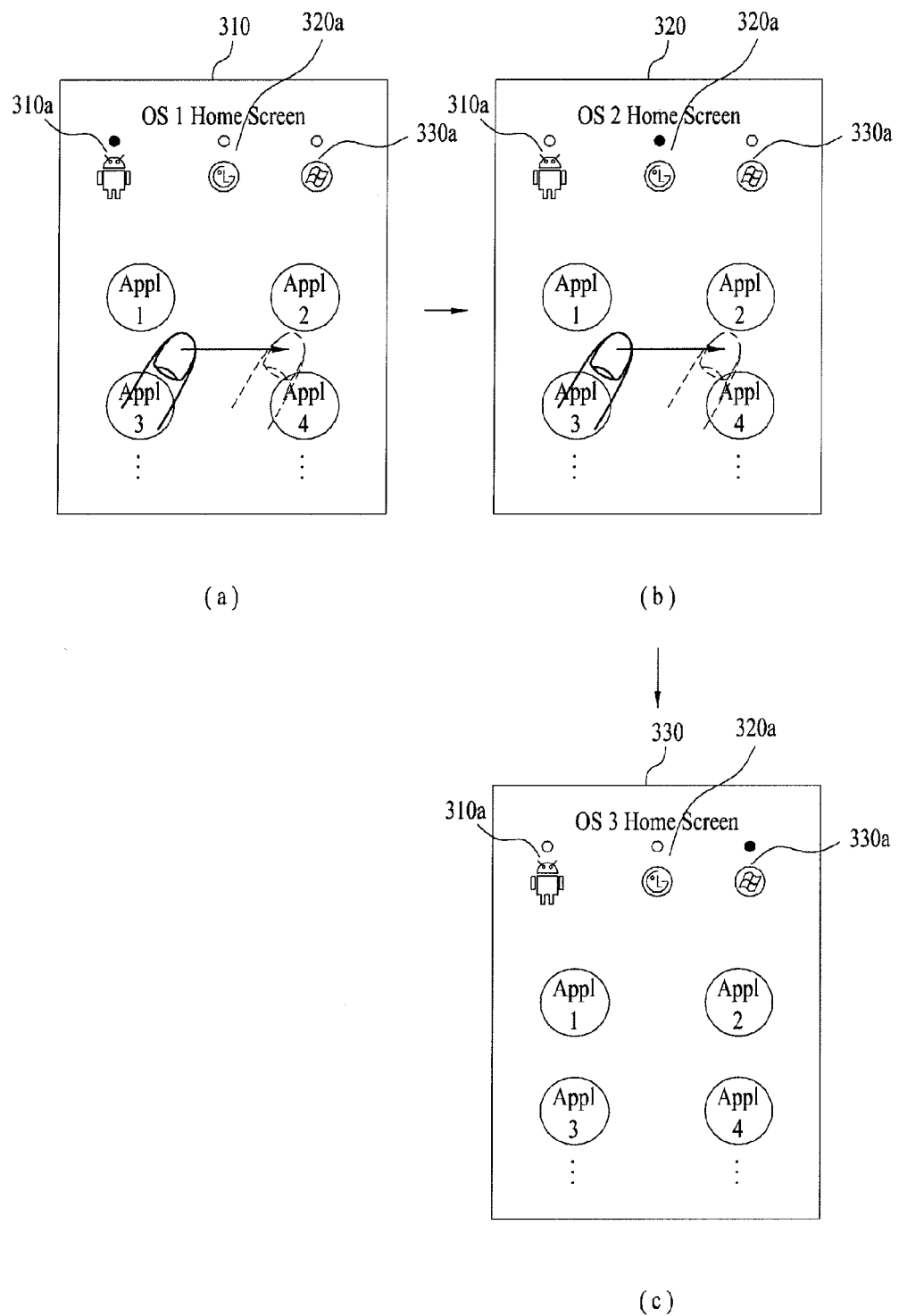

FIGS. 6 to 8 are diagrams of screen configurations of a process for displaying screens respectively dedicated to operating system in a manner of switching the dedicated screens to each other according to a first embodiment of the present invention.

Referring to FIGS. 5 to 8, the controller 180 displays a specific first OS dedicated screen 310 among all operating systems provided to the memory 160 on the touchscreen 151 [S110].

In this case, the first OS dedicated screen 310 is a home screen including applications executable in a first OS environment. For example, FIG. 6 shows that first to fourth applications are included in the home screen.

The first OS dedicated screen 310 initially displayed on the touchscreen 151 can be set by a user. Alternatively, the first OS dedicated screen 310 can include an OS dedicated screen finally displayed before the driving of the screen of the touchscreen 151 is turned off. Alternatively, the first OS dedicated screen 310 can include an OS dedicated screen finally displayed before the driving of the mobile terminal 100 is turned off. Alternatively, the first OS dedicated screen 310 can include a dedicated screen most frequently used among the dedicated screens of the entire operating systems.

Before the first OS dedicated screen 310 displayed in the step S110 is displayed, the controller 180 simultaneously drives the entire operating systems provided to the memory 160 or can drive the first OS currently displayed on the touchscreen 151 only.

Subsequently, the controller 180 detects whether a command for switching the first OS dedicated screen 310 to a second OS dedicated screen 320 is inputted to the first OS dedicated screen 310 [S120].

In this case, the OS dedicated screen switching command, as shown in FIG. 6, can include a flicking touch having specific directionality (e.g., a right direction) inputted to the first OS dedicated screen 310, a long touch or a touch gesture having a preset pattern.

The OS dedicated screen switching command can include a preset key input provided to the user input unit 130 or a touch to an icon having a dedicated screen switching function of each OS assigned thereto. In this case, the icon is displayed on the first OS dedicated screen 310.

As a result of the detection in the step S120, if the command for switching the first OS dedicated screen 310 to the second OS dedicated screen 320 is inputted [S130], the controller switches the first OS dedicated screen 310 to the second OS dedicated screen 320 and then displays the second OS dedicated screen 320 [S140].

In this case, while the entire operating systems are simultaneously driven, if the switching command is inputted, the controller 180 stops displaying the first OS dedicated screen 310 by having the entire operating systems keep being driven and is then able to display the second OS dedicated screen 320.

In particular, while the entire operating systems keep being driven, the controller 180 suspends (i.e., deactivates) the display or the first OS dedicated screen 310 and activates the second OS dedicated screen 320. Therefore, the controller 180 is able to switch the first OS dedicated screen 310 to the second OS dedicated screen 320.

While the first OS among the entire operating systems is being driven, if the command for switching the first OS dedicated screen 310 to the second OS dedicated screen 320 is inputted, the controller 180 suspends the display of the drive-off first OS dedicated screen 310, drives the second OS, and then displays the second OS dedicated screen 320.

The controller 180 displays informations 310a, 320a and 330a respectively indicating the entire operating systems on the touchscreen 151, as shown in FIG. 6. Particularly, the controller 180 is able to control the information 310a corresponding to the currently display OS dedicated screen 310 to be displayed in a manner of being distinguished from the rest of the informations 320a and 330a.

Referring to FIG. 6 (a), if the first OS dedicated screen 310 is displayed, the controller 180 displays the first information 310a corresponding to the first OS among the informations 310a, 320a and 330a in a manner that the first information 310a is distinguished from the second and third informations 320a and 330a.

In this case, referring to FIG. 6, the informations 310a, 320a and 330a indicate the corresponding operating systems, respectively. And, each of the informations 310a, 320a and 330a indicates which one of the OS dedicated screens is currently displayed on the touchscreen 151.

In particular, a user can be aware that a specific OS dedicated screen is currently displayed on the touchscreen by looking at the informations 310a, 320a and 330a.

Meanwhile, if a flicking touch in a specific direction is inputted as a switching command for the OS dedicated screen to the first OS dedicated screen 310 [FIG. 6 (a)], the controller 180 switches the first OS dedicated screen 310 to a second OS dedicated screen 320 in next order and then displays the second OS dedicated screen 320 [FIG. 6 (b)].

If the second OS dedicated screen 320 is displayed, the controller 180 controls the second information 320a corresponding to the second OS among the informations 310a, 320a and 330a to be displayed in a manner of being distinguished from the first information 310a and the third information 330a.

Moreover, if a flicking touch in a specific direction is inputted again as a switching command for the OS dedicated screen to the second OS dedicated screen 320 [FIG. 6 (b)], the controller 180 switches the second OS dedicated screen 320 to a third OS dedicated screen 330 in next order and then displays the third OS dedicated screen 330 [FIG. 6 (c)].

Besides, if the second information 320a among the informations 310a, 320a and 330a is touched, the controller 180 switches the first OS dedicated screen 310 to the second OS dedicated screen 320 in next order and then displays the second OS dedicated screen 320 [not shown in the drawing].

Meanwhile, although FIG. 6 shows that the informations 310a, 320a and 330a are displayed within the OS dedicated screen, the informations 310a, 320a and 330a can be displayed on an indicator region of the touchscreen 151. In this case, the indicator region is the region in which icons for indicating operative statuses of the mobile terminal 100 are displayed. The indicator region is normally situated at the top side of the touchscreen 151 to indicate such information as antenna reception status, remaining battery level status, current hour, date and the like.

Referring to FIG. 7 and FIG. 8, the controller 180 is able to display informations 310b, 320b and 330b, each of which indicates a specific one of all operating systems is currently driven, on the touchscreen.

In particular, referring to FIG. 7 (a), the controller 180 drives all operating systems simultaneously and then controls the informations 310b, 320b and 330b indicating the driven statuses of the entire operating systems to be displayed within the first OS dedicated screen 310 that is initially displayed.

If a specific one (e.g., the second information 320b) of the informations 310b, 320b and 330b is touched [FIG. 7 (a)], the controller 180 is able to turn off the driving of the second OS corresponding to the second information 320b [FIG. 7 (b)]. After the driving of the second OS has been turned off, if the second information 320b is touched again, the controller 180 is able to drive the second OS again.

Meanwhile, although FIG. 7 shows that the informations 310b, 320b and 330ba are displayed within the OS dedicated screen, the informations 310b, 320b and 330b can be displayed on an indicator region of the touchscreen 151.

Referring to FIG. 8 (a), the controller 180 initially drives the first OS only, controls the informations 310b, 320b and 330b indicating the driven statuses of the entire operating systems to be displayed within the first OS dedicated screen 310, and controls the information 310b indicating the currently driven first OS among the informations 310b, 320b and 330b to be displayed by being distinguished from the second information 320b and the third information 330b.

Meanwhile, if a flicking touch in a specific direction is inputted as a switching command for the OS dedicated screen to the first OS dedicated screen 310, referring to FIG. 8 (b), the controller 180 turns off the driving of the first OS, drives the second OS, stops displaying the first OS dedicated screen 310, and displays the second OS dedicated screen 320.

In doing so, the controller 180 controls the information 320b indicating the driven second OS to be displayed by being distinguished from the first information 310b and the third information 330b.

Besides, if a flicking touch in a specific direction is inputted as a switching command for the OS dedicated screen to the second OS dedicated screen 320, referring to FIG. 8 (c), the controller 180 turns off the driving of the second OS, drives the third OS, stops displaying the second OS dedicated screen 320, and displays the third OS dedicated screen 330.

In doing so, the controller 180 controls the information 330b indicating the driven third OS to be displayed by being distinguished from the first information 310b and the second information 320b.

In the above description, so far, the first embodiment of the present invention is explained in detail with reference to FIGS. 5 to 8.

In the following description, a second embodiment of the present invention is explained in detail with reference to FIGS. 9 to 35.

Second Embodiment

According to a second embodiment of the present invention, in case that a plurality of operating systems are provided, a home screen dedicated to each of the operating systems is displayed on a single screen.

In particular, according to a second embodiment of the present invention, the controller 180 of the mobile terminal 100 searches the memory 160 for applications dedicated to operating systems, configures dedicated screens of the operating systems including the found applications, respectively, displays the configured OS dedicated screens within a single screen off the touchscreen 151, and controls operations related to the OS dedicated screens.

In the following description, a process for the controller 180 to display all OS dedicated screens within a single screen together is explained in detail with reference to FIGS. 9 to 35.

Embodiment 2-1

Figure 9:
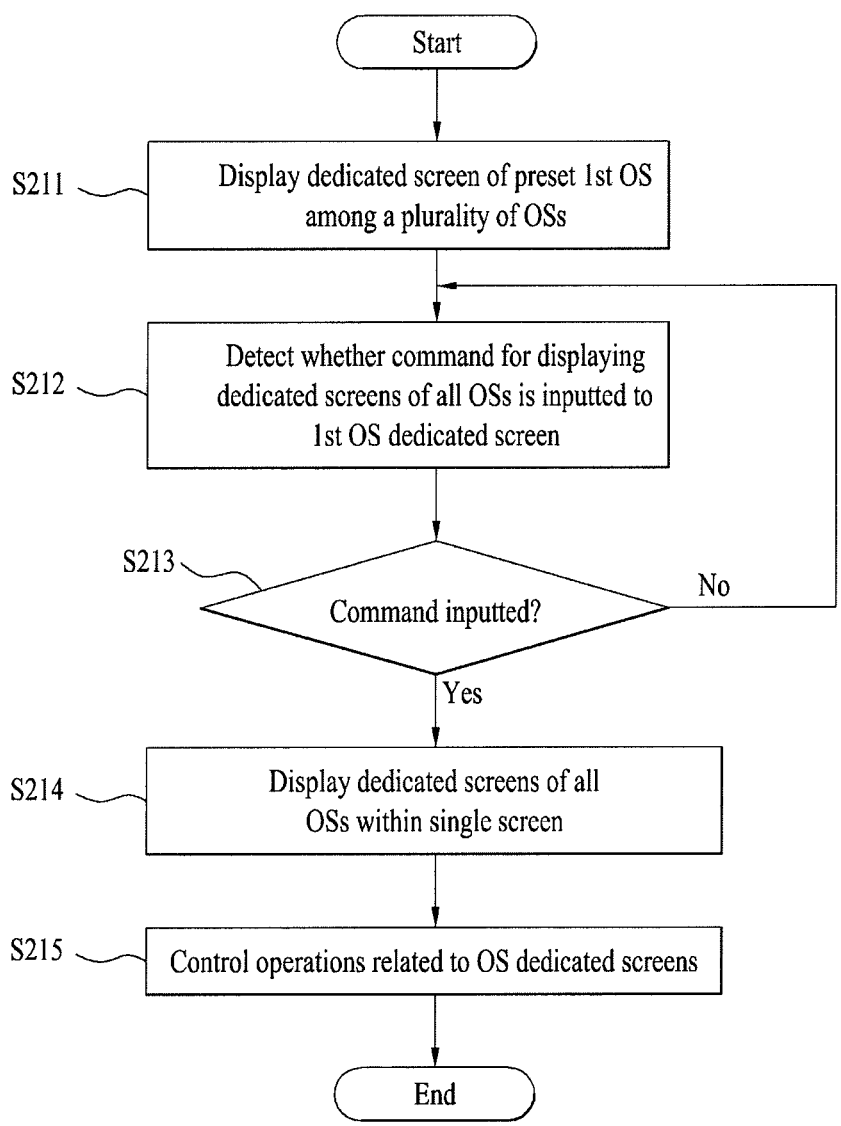
FIG. 9 is a flowchart of a process for displaying at least two OS dedicated screens on a single screen together according to an embodiment 2-1 of the present invention.

FIG. 9 is a flowchart of a process for displaying at least two OS dedicated screens on a single screen together according to an embodiment 2-1 of the present invention.

Figure 10:
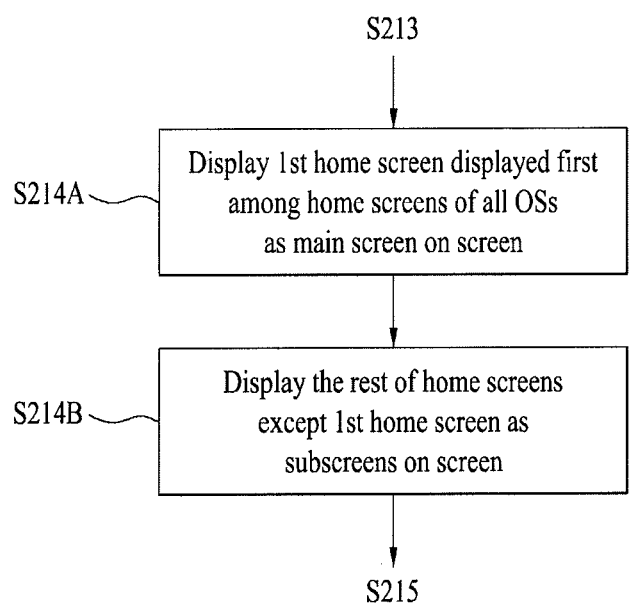
FIG. 10 is a flowchart of a process for displaying dedicated screens of operating systems as a main screen or subscreens within a single screen in the process shown in FIG. 9 according to an embodiment 2-1 of the present invention.

FIG. 10 is a flowchart of a process for displaying dedicated screens of operating systems as a main screen or subscreens within a single screen in the process shown in FIG. 9 according to an embodiment 2-1 of the present invention.

Figure 11:
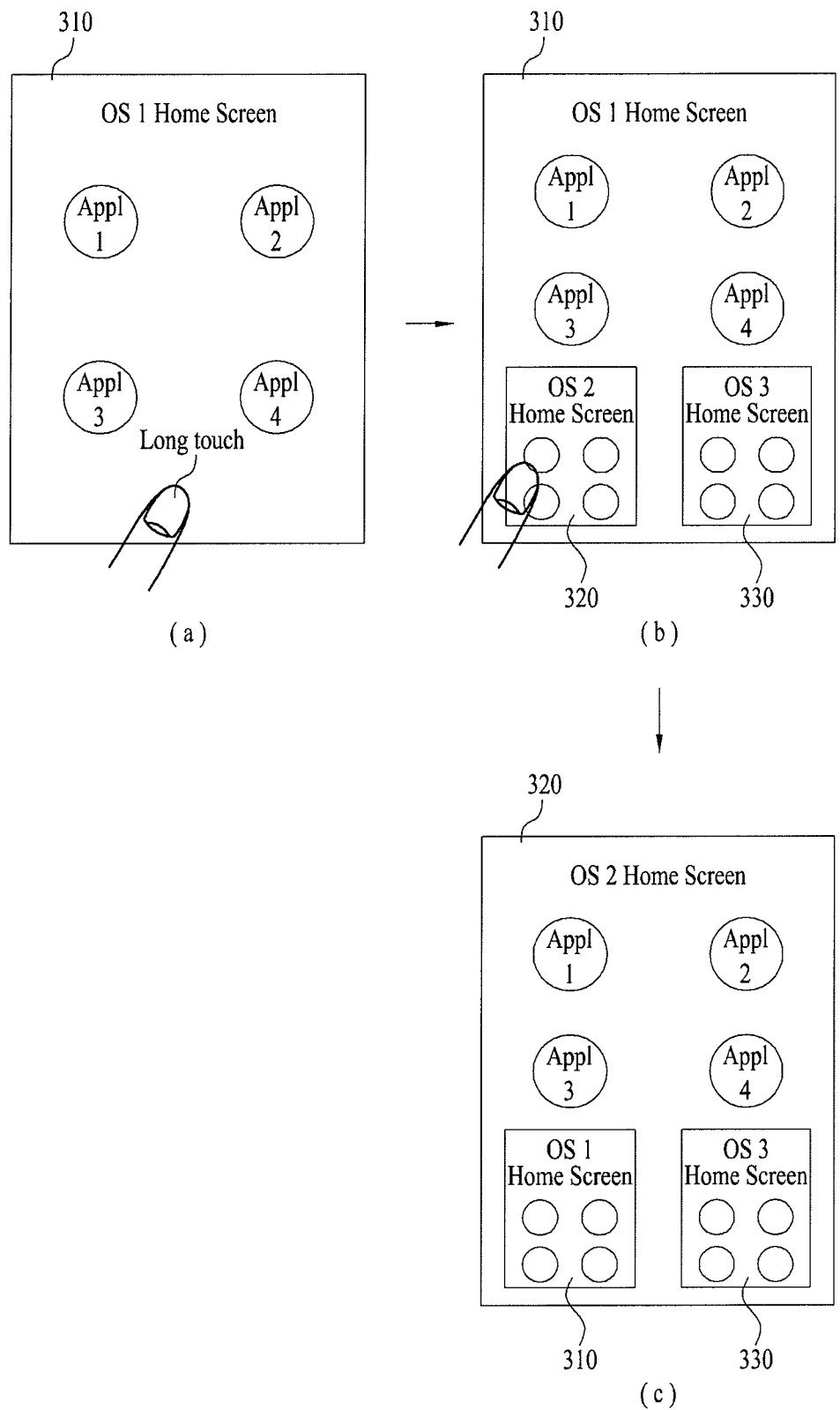
FIG. 11 is a diagram of screen configurations of a process for displaying at least two OS dedicated screens on a single screen together according to an embodiment 2-1 of the present invention.

FIG. 11 is a diagram of screen configurations of a process for displaying at least two OS dedicated screens on a single screen together according to an embodiment 2-1 of the present invention.

Figure 12:
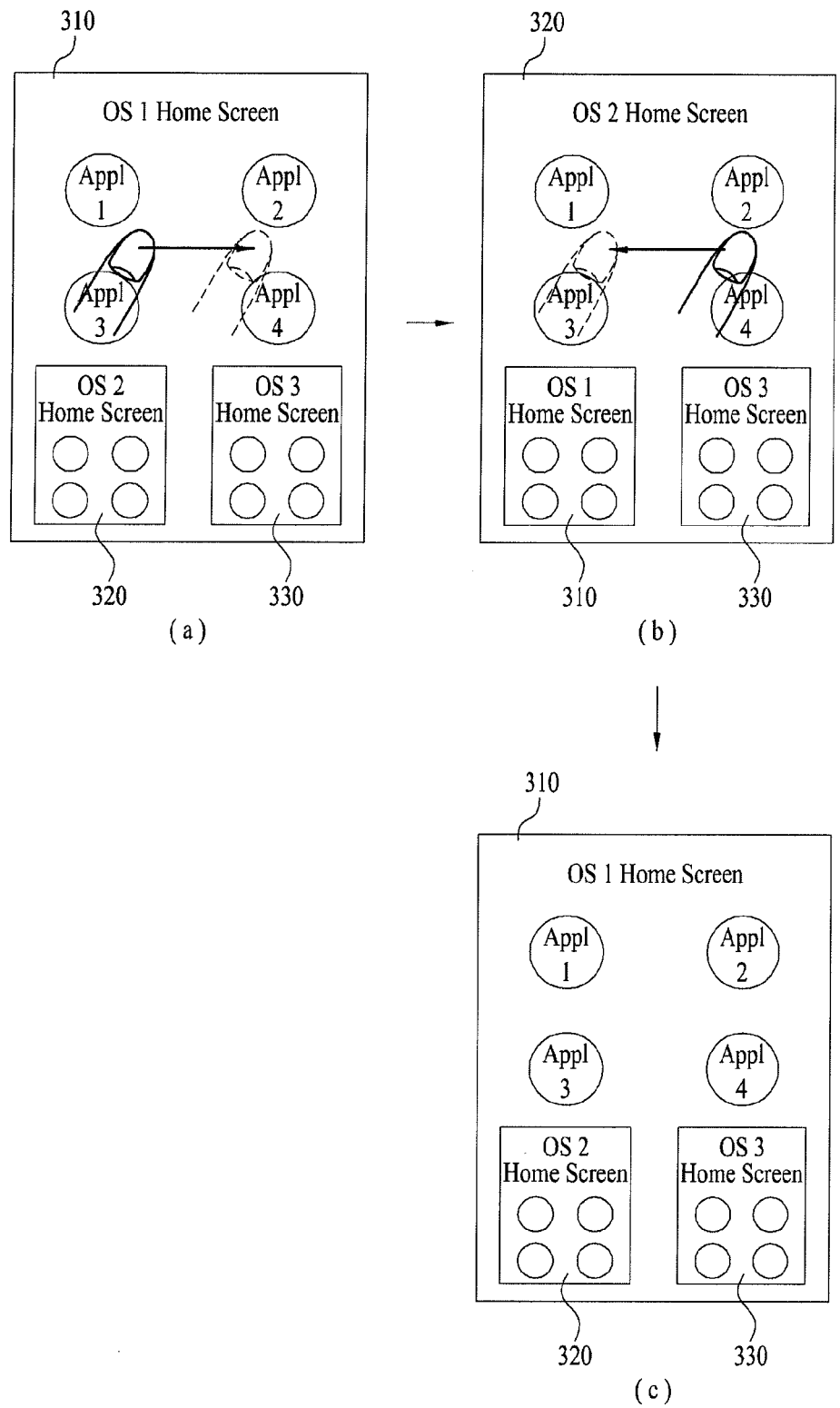
FIG. 12 is a diagram of screen configurations of a process for switching OS dedicated screens to each other in case of displaying at least two OS dedicated screens within a single screen together according to an embodiment 2-1 of the present invention.

And, FIG. 12 is a diagram of screen configurations of a process for switching OS dedicated screens to each other in case of displaying at least two OS dedicated screens within a single screen together according to an embodiment 2-1 of the present invention.

Referring to FIGS. 9 to 12, the controller 180 controls a dedicated screen 310 of a preset first OS among all operating systems provided to the memory 160 to be displayed on the touchscreen 151 [S211].

In this case, the first OS dedicated screen 310 includes a plurality of applications executable in a first OS environment. For instance, FIGS. 10 to 12 show that first to fourth applications are included in the first OS dedicated screen 310.

The first OS dedicated screen 310 displayed in the step S211 can be set by a user. Alternatively, the first OS dedicated screen 310 can include an OS dedicated screen finally displayed before the driving of the screen of the touchscreen 151 is turned off. Alternatively, the first OS dedicated screen 310 can include an OS dedicated screen finally displayed before the driving of the mobile terminal 100 is turned off. Alternatively, the first OS dedicated screen 310 can include a dedicated screen most frequently used among the dedicated screens of the entire operating systems.

Before the first OS dedicated screen 310 displayed in the step S211 is displayed, the controller 180 simultaneously drives the entire operating systems provided to the memory 160 or can drive the first OS only.

Subsequently, the controller 180 detects whether a command for displaying the dedicated screens of the entire operating systems together is inputted to the first OS dedicated screen 310 [S212].

In this case, the entire OS dedicated screen display command, as shown in FIG. 11, can include a long touch inputted to the first OS dedicated screen 310 or a touch gesture having a preset pattern. Alternatively, the entire OS dedicated screen display command can include a preset key input provided to the user input unit 130 or a touch to an icon having a dedicated screen switching function of all operating system assigned thereto.

As a result of the detection in the step S212, if the command for displaying the entire OS dedicated screens is inputted [S213] [FIG. 11 (a)], the controller 180 displays the dedicated screens 310, 320 and 330 of the entire operating systems provided to the memory within a single screen of the touchscreen 151 [S214] [FIG. 11 (b)] and then controls operations related to the home screens 310, 320 and 330 [S215].

In doing so, referring to FIG. 10 and FIG. 11 (b), the controller 180 controls the first OS dedicated screen 310 first displayed in the step S211 among the dedicated screens 310, 320 and 330 of the operating systems to be displayed as a main screen within the screen [S214A] and controls the second and third OS dedicated screens 320 and 330 except the first OS dedicated screen 310 to be displayed as subscreens [S114B].

In particular, referring to FIG. 11 (b), the controller 180 displays the first OS dedicated screen 310 on the touchscreen 151 by full-up and also displays the second and third OS dedicated screens 320 and 330 within the full-up first OS dedicated screen 310 by PIP (picture in picture).

In more particular, the controller 180 is able to display the second and third OS dedicated screens 320 and 330, which are displayed as the subscreens, as thumbnails or popups. Alternatively, the controller 180 is able to display the second and third OS dedicated screens 320 and 330 transparently. Alternatively, the controller 180 is able to display the second and third OS dedicated screens 320 and 330 by blinking.

Meanwhile, according to a touch performed by a user, the controller 180 is able to display the first OS dedicated screen 310 of the main screen and the second and third OS dedicated screens 320 and 330 of the subscreens in a manner of switching them to one another.

For instance, referring to FIG. 11 (b), if the second OS dedicated screen 320 of the subscreen is touched, the controller 180 displays the second OS dedicated screen 320 as a main screen and also displays the first OS dedicated screen 310, which used to be the main screen, as the subscreen.

Meanwhile, if a first flicking touch (e.g., a flicking touch to the right) is inputted to the first OS dedicated screen 310 as a command for switching the OS dedicated screen [FIG. 12 (a)], the controller 180 displays the first OS dedicated screen 310 and the second OS dedicated screen 320 as the subscreen and the main screen, respectively [FIG. 12 (b)].

On the contrary, if a second flicking touch (e.g., a flicking touch to the left) in a direction opposite to that of the first flicking touch is inputted to the second OS dedicated screen 320 [FIG. 12 (b)], the controller 180 is able to re-display the second OS dedicated screen 320 and the first OS dedicated screen 310 as the subscreen and the main screen, respectively [FIG. 12 (b)].

While the first to third operating systems are being driven simultaneously, the controller 180 is able to display switching screens by switching the switching screens to one another according to a touch performed by a user. While the first OS is initially driven only, if the second OS dedicated screen 320 is touched, the controller 180 turns of the driving of the first OS, drives the second OS, and is then able to display the second OS dedicated screen 320 as the main screen.

Namely, according to the present invention described in the following description, while all operating systems are being driven simultaneously, the respective OS dedicated screens are displayed and switched. Alternatively, an operating system displayed as a main screen within a screen is driven only but the rest of operating systems displayed as subscreens can stop being driven.

The process for the controller 180 to control the operations related to the OS dedicated screens 310, 320 and 330 in the step S215 shall be described in detail with reference to FIGS. 17 to 35 later.

Embodiment 2-2

Figure 13:
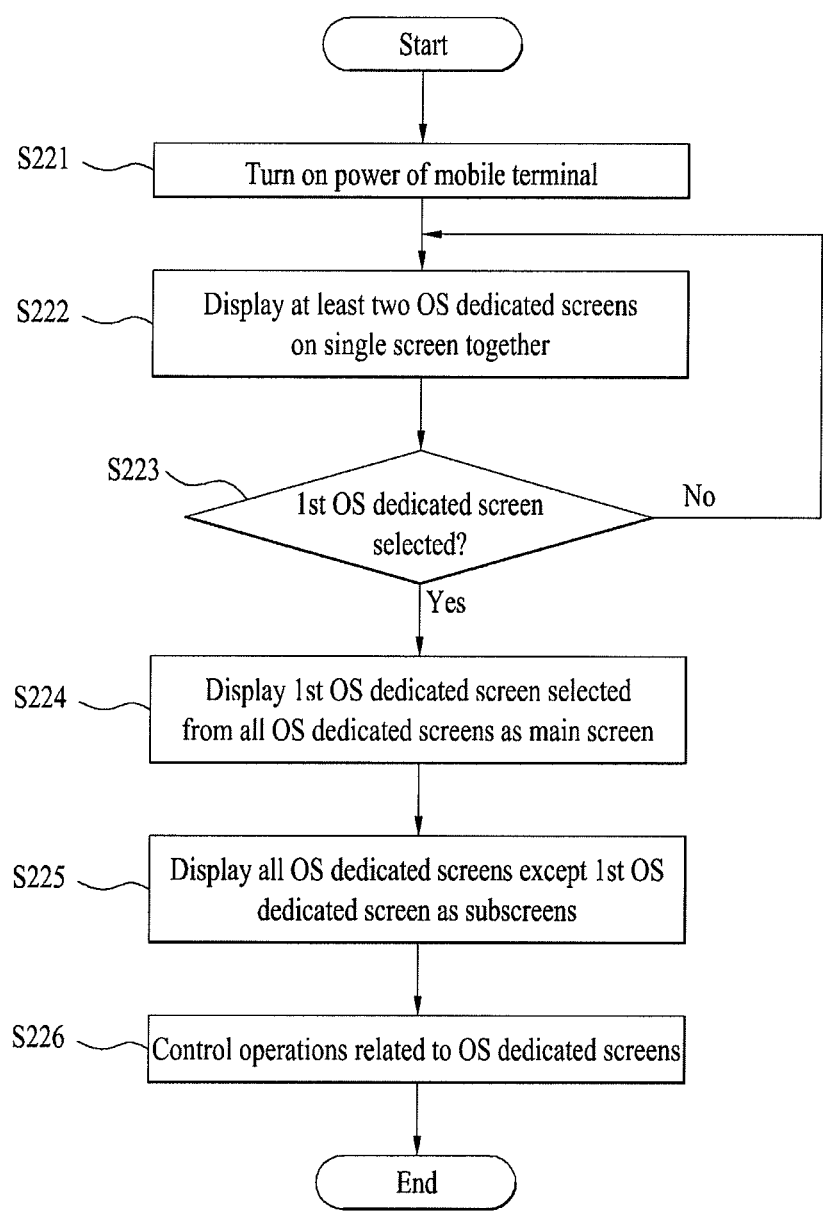
FIG. 13 is a flowchart of a process for displaying at least two OS dedicated screens on a single screen together according to an embodiment 2-2 of the present invention.

FIG. 13 is a flowchart of a process for displaying at least two OS dedicated screens on a single screen together according to an embodiment 2-2 of the present invention.

Figure 14:
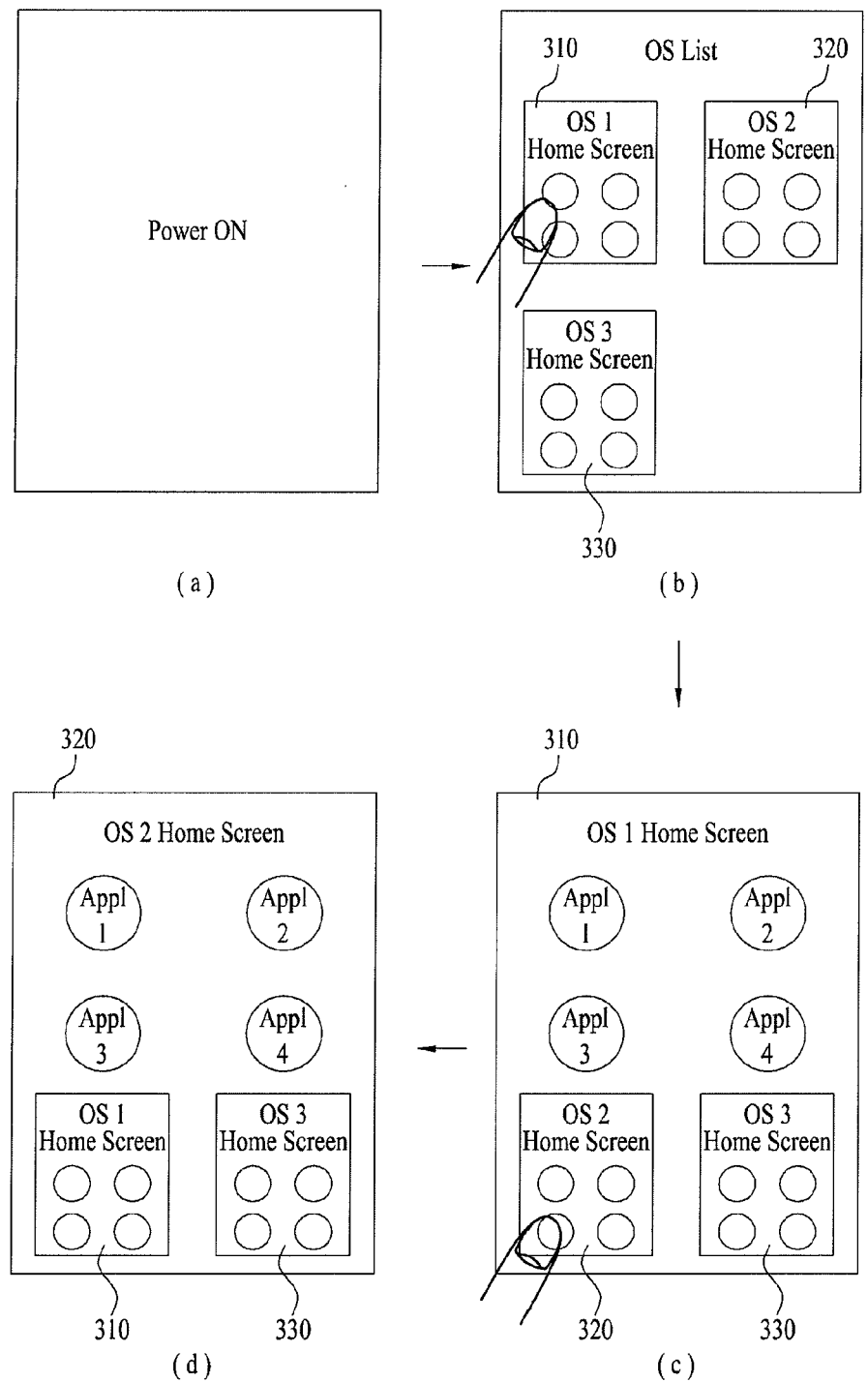
FIG. 14 is a diagram of screen configurations of a process for displaying at least two OS dedicated screens on a single screen together according to an embodiment 2-2 of the present invention.

And, FIG. 14 is a diagram of screen configurations of a process for displaying at least two OS dedicated screens on a single screen together according to an embodiment 2-2 of the present invention.

Referring to FIG. 13 and FIG. 14, if a user turns off a power of the mobile terminal 100 [S221] [FIG. 14 (a)], the controller 180 controls dedicated screens 310, 320 and 330 of all operating systems provided to the memory 160 to be displayed together within a single screen of the touchscreen 151 [S222].

If a specific first OS dedicated screen 310 is selected from the dedicated screens 310, 320 and 330 of the operating systems [S223] [FIG. 14 (b)], the controller 180 controls the selected first OS dedicated screen 310 to be displayed as a main screen [S224] [FIG. 14 (c)], controls the dedicated screens 320 and 330 of the rest of the operating systems to be displayed as subscreens [S225] [FIG. 14 (c)], and controls operations related to the OS dedicated screens 310, 320 and 330 according to a command made by the user [S226].

Meanwhile, a process for the controller 180 to control the operations related to the OS dedicated screens 310, 320 and 330 shall be described in detail with reference to FIGS. 17 to 35 later.

Embodiment 2-3

Figure 15:
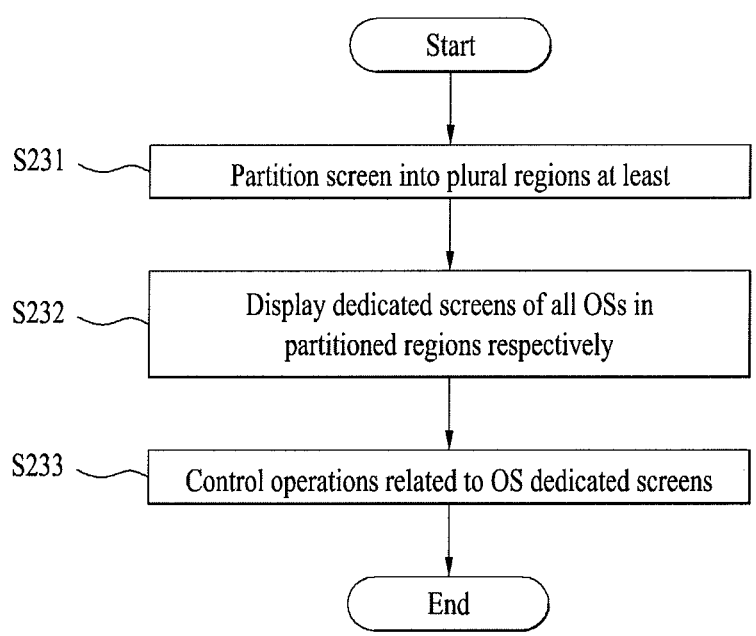
FIG. 15 is a flowchart of a process for displaying at least two OS dedicated screens on a single screen together according to an embodiment 2-3 of the present invention.

FIG. 15 is a flowchart of a process for displaying at least two OS dedicated screens on a single screen together according to an embodiment 2-3 of the present invention.

Figure 16:
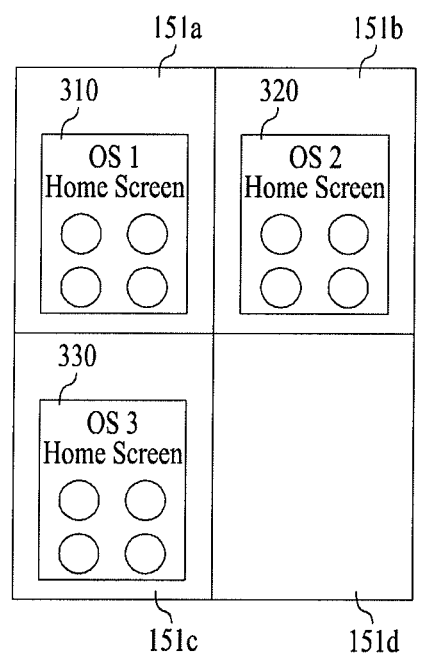
FIG. 16 is a diagram of screen configurations of a process for displaying at least two OS dedicated screens on a single screen together according to an embodiment 2-3 of the present invention.

And, FIG. 16 is a diagram of screen configurations of a process for displaying at least two OS dedicated screens on a single screen together according to an embodiment 2-3 of the present invention.

Referring to FIG. 15 and FIG. 16, if a user turns on a power of the mobile terminal 100 or a command for displaying dedicated screens 310, 320 and 330 of all operating systems provided to the memory 160 within a single screen together is inputted, the controller 180 partitions a screen of the touchscreen 151 into a plurality of regions including first to third regions 151a, 151b and 151c [S231], controls the dedicated screens 310, 320 and 330 of the operating systems to be displayed in the first to third regions 151a, 151b and 151c, respectively [S232] [FIG. 16], and controls operations related to the dedicated screens 310, 320 and 330 of the operating systems according to a command made by the user [S233].

Meanwhile, a process for the controller 180 to control the operations related to the OS dedicated screens 310, 320 and 330 shall be described in detail with reference to FIGS. 17 to 35 later.

In the above description, the process for the controller 180 to display the OS dedicated screens 310, 320 and 330 within a single screen is explained with reference to FIGS. 9 to 16.

In the following description, a process for controlling operations related to the OS dedicated screens 310, 320 and 330 displayed together within the single screen is explained with reference to FIGS. 17 to 35.

Embodiment 2-4

FIG. 17 is a diagram of screen configurations of a process for displaying information indicating a corresponding OS on each dedicated screen per OS displayed together on a single screen according to an embodiment 2-4 of the present invention.

Referring to FIG. 17 (a), if the OS dedicated screens 310, 320 and 330 are displayed together by the process shown in FIGS. 9 to 16, the controller is able to display first to third informations 411a, 411b and 411c indicating operating systems corresponding to the OS dedicated screens 310, 320 and 330, respectively.

In this case, the first to third informations 411a, 411b and 411c can include names of the corresponding operating systems, unique symbols of the corresponding operating systems or the like, respectively.

And, each of the first to third informations 411a, 411b and 411c can include the information indicating whether the corresponding operating system is currently driven. For instance, referring to FIG. 17 (a), the information indicating whether the corresponding operating system is driven can be displayed on each of the unique symbols 411a, 411b and 411c respectively indicating the corresponding operating systems. In FIG. 17 (a), the first operating system is driven, while the drivings of the second and third operating systems are turned off.

Moreover, if the first information 411a indicating the first operating system is selected from the first to third informations 411a, 411b and 411c [FIG. 17 (a)], the controller 180 is able to search and display the detail information related to the first operating system. In this case, the detail information related to the first operating system can include a name, version information and installation data of the first operating system and the like.

The controller 180 displays the first to third informations 411a, 411b and 411c on the OS dedicated screens 310, 320 and 330, respectively and is able to display the first information 411a within the first OS dedicated screen 310, which are currently displayed as a subscreen, in a manner that the first information 411a is distinguished from the second information 411b within the second OS dedicated screen 320 and/or the third information 411c within the third OS dedicated screen 330.

In particular, referring to FIG. 17 (a), a user looks at the first to third informations 411a, 411b and 411c and can be then aware that a prescribed one of the OS dedicated screens 310, 320 and 330 is displayed as the main screen or the subscreen.

Embodiment 2-5

Figure 18:
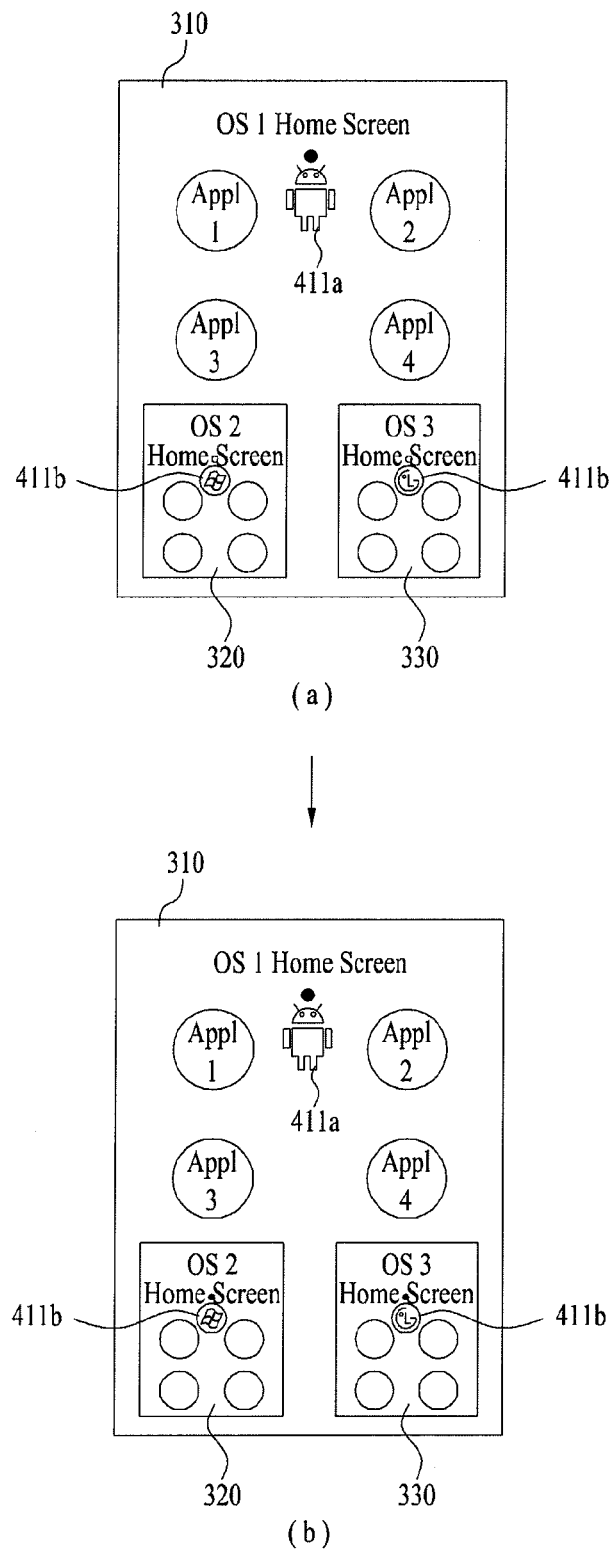
FIG. 18 is a diagram of screen configurations of a process for displaying information indicating whether each OS is driven according to an embodiment 2-5 of the present invention.

FIG. 18 is a diagram of screen configurations of a process for displaying information indicating whether each OS is driven according to an embodiment 2-5 of the present invention.

Referring to FIG. 18 (a), if the first OS corresponding to the first OS dedicated screen 310 displayed as the main screen is driven only by the process shown in FIGS. 9 to 16, the controller 180 displays the first information 411a indicating that the first OS has been driven within the first OS dedicated screen 310.

Moreover, if the drivings of the second and third operating systems corresponding to the second and third OS dedicated screens 320 and 330 displayed as the subscreens are turned off, the controller 180 displays the second information 411b and the third information 411c on the second OS dedicated screen 320 and the third OS dedicated screen 330, respectively, to indicate that the drivings of the second and third operating systems are turned off.

Referring to FIG. 18 (b), if the first to third operating systems off the OS dedicated screens 310, 320 and 330 are simultaneously driven by the process shown in FIGS. 9 to 16, the controller 180 displays the information indicating that corresponding operating system is driven on each of the OS dedicated screens 310, 320 and 330.

Embodiment 2-6

Figure 19:
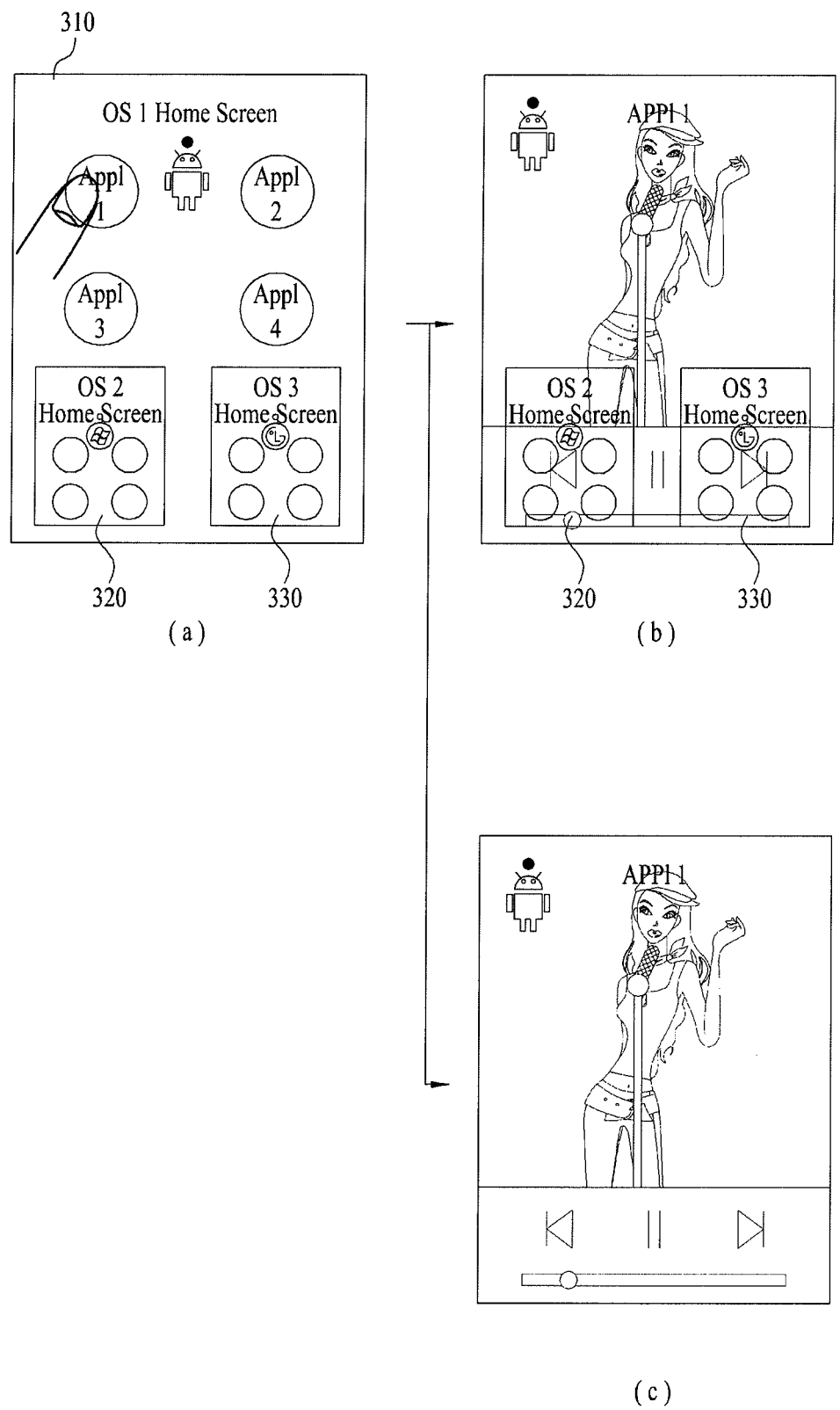
FIG. 19 and FIG. 20 are diagrams of screen configurations of a process for executing an application within an OS dedicated screen according to an embodiment 2-6 of the present invention.
Figure 20:
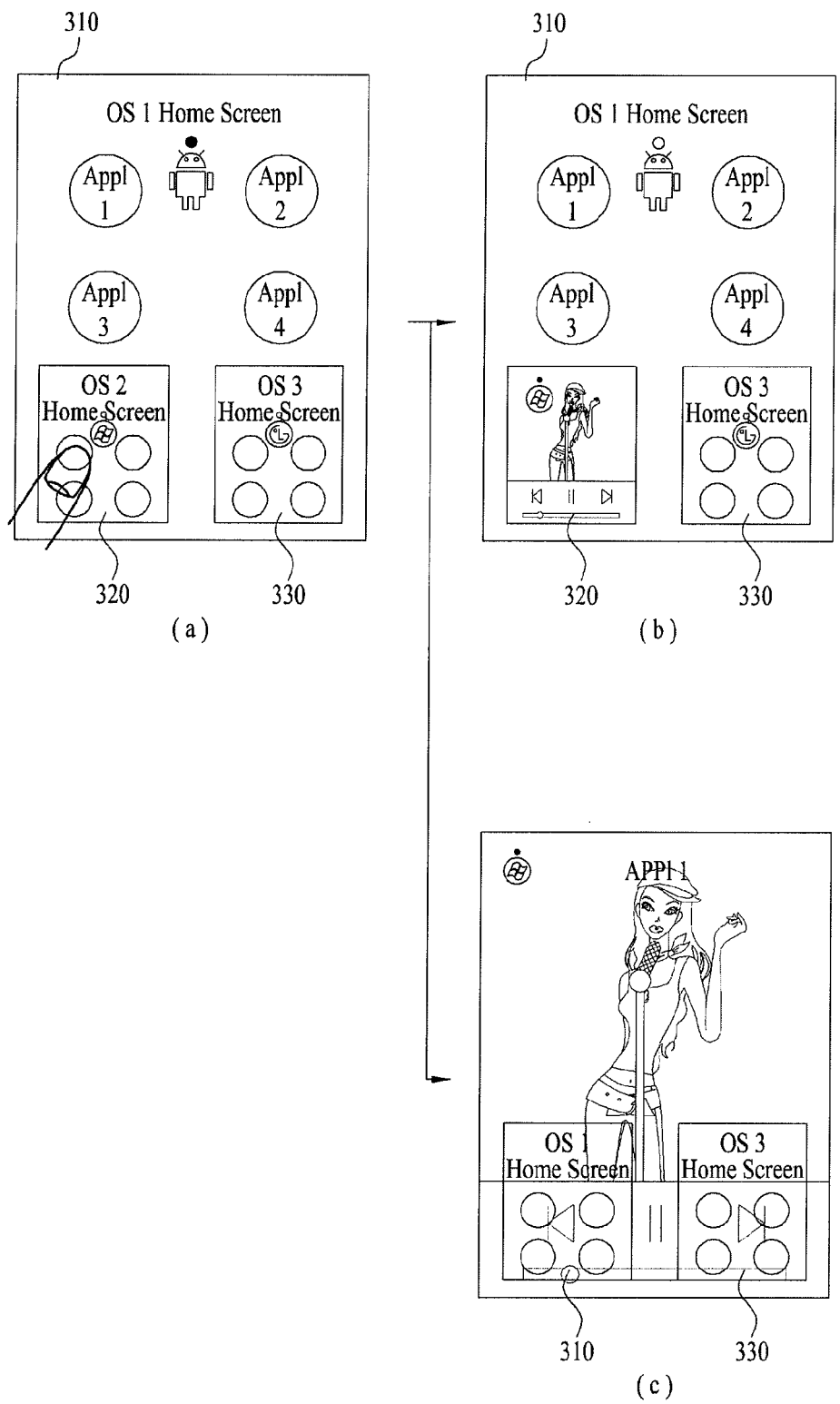

FIG. 19 and FIG. 20 are diagrams of screen configurations of a process for executing an application within an OS dedicated screen according to an embodiment 2-6 of the present invention.

Referring to FIG. 19 (a), while the first OS dedicated screen 310 is displayed as a main screen by the process shown in FIGS. 9 to 16 and the second and third OS dedicated screens 320 and 330 are displayed as subscreens by the process shown in FIGS. 9 to 16, if a specific application is selected from the first OS dedicated screen 310, the controller 180 executes the selected application. Referring to FIG. 19 (b), the controller 180 displays an executed screen of the application within the first OS dedicated screen 310. In this case, within the executed screen of the application, the second and third OS dedicated screens 320 and 330 are displayed as subscreens.

Referring to FIG. 19 (c), the controller 180 switches the screen, on which the OS dedicated screens 310, 320 and 330 are displayed together, to the executed screen of the selected application and is then able to display the executed screen.

Referring to FIG. 20 (a), if a specific application is selected from the second OS dedicated screen 320 displayed as the subscreen, the controller 180 executes the selected application. Referring to FIG. 20 (b), the controller 180 displays an executed screen of the application within the second OS dedicated screen 320.

Referring to FIG. 20 (c), the controller 180 displays the first OS dedicated screen 310, which was displayed as the main screen, as a subscreen and is then able to display the executed screen of the application as a main screen. In this case, the first and third OS dedicated screens 310 and 330 are displayed as subscreens on the executed screen of the application, respectively.

Embodiment 2-7

FIGS. 21 to 23 are diagrams of screen configurations of a process for unifying at least two OS dedicated screens into a new OS dedicated screen according to an embodiment 2-7 of the present invention.

FIG. 24 and FIG. 25 are diagrams of screen configurations of a process for separating the OS dedicated screen implemented by the process shown in FIGS. 21 to 23 into original screens according to an embodiment 2-7 of the present invention.

First of all, while the OS dedicated screens 310, 320 and 330 are displayed on a single screen together by the process shown in FIGS. 9 to 16, if a command for unifying at least two OS dedicated screens 320 and 330 together is inputted, the controller 180 generates a new OS dedicated screen 420 from unifying the OS dedicated screens 320 and 330 into one and then displays the generated new OS dedicated screen 420.

In this case, the unifying command can include such a touch input as shown in FIGS. 21 to 23.

While the first OS dedicated screen 310 is displayed as a main screen by the process shown in FIGS. 9 to 16 and the second and third OS dedicated screens 320 and 330 are displayed as subscreens by the process shown in FIGS. 9 to 16, if the second OS dedicated screen 320 is dragged & dropped to the third OS dedicated screen 330 [FIG. 21 (a)], the controller 180 generates a new OS dedicated screen 420 from unifying the second and third OS dedicated screens 320 and 330 into one and then displays the generated new OS dedicated screen 420.

In this case, the controller 180 controls information indicating operating systems of the unified second and third OS dedicated screens 320 and 330 to be displayed within the new OS dedicated screen 420. Therefore, a user can be informed that the second and third OS dedicated screens 320 and 330 are unified into the new OS dedicated screen 420.

If a specific region is dragged on the screen for displaying the OS dedicated screens 310, 320 and 330 together [FIG. 22 (a)], the controller generates a new OS dedicated screen 420 from unifying the OS dedicated screens 320 and 330 existing within the dragged region into one and then displays the generated new OS dedicated screen 420 [FIG. 22 (b)].

If the second and third OS dedicated screens 320 and 330 are multi-touched [FIG. 23 (a)], the controller 180 generates a new OS dedicated screen 420 from unifying the multi-touched second and third OS dedicated screens 320 and 330 into one and then displays the generated new OS dedicated screen 420 [FIG. 23 (b)].

Subsequently, referring to FIG. 24 and FIG. 25, after the new OS dedicated screen 420 has been generated by the process shown in FIGS. 21 to 23, if a command for separating the new OS dedicated screen 420 into the original second and third OS dedicated screens 320 and 330, i.e., a command for releasing the unification is inputted, the controller 180 separates the new OS dedicated screen 420 into the original second and third OS dedicated screens 320 and 330 and then displays the second and third OS dedicated screens 320 and 330 separated from each other.

In this case, the unification release command can include one of various touch inputs shown in FIG. 24 and FIG. 25.

In particular, if a long touch is inputted to the new OS dedicated screen 420 [FIG. 24 (a)], the controller 180 separates the new OS dedicated screen 420 into the original second and third OS dedicated screens 320 and 330 and then displays the second and third OS dedicated screens 320 and 330 separated from each other [FIG. 24 (b)].

If a multi-touch corresponding to pinching-out is inputted to the new OS dedicated screen 420 [FIG. 25 (a)], the controller 180 separates the new OS dedicated screen 420 into the original second and third OS dedicated screens 320 and 330 and then displays the second and third OS dedicated screens 320 and 330 separated from each other [FIG. 25 (b)].

In this case, the pinching-out multi-touch means the touch performed in a manner of multi-touching first and second points of the new OS dedicated screen 420 and increasing the distance between the first and second points over a preset distance by maintaining the multi-touch.

Embodiment 2-8

Figure 26:
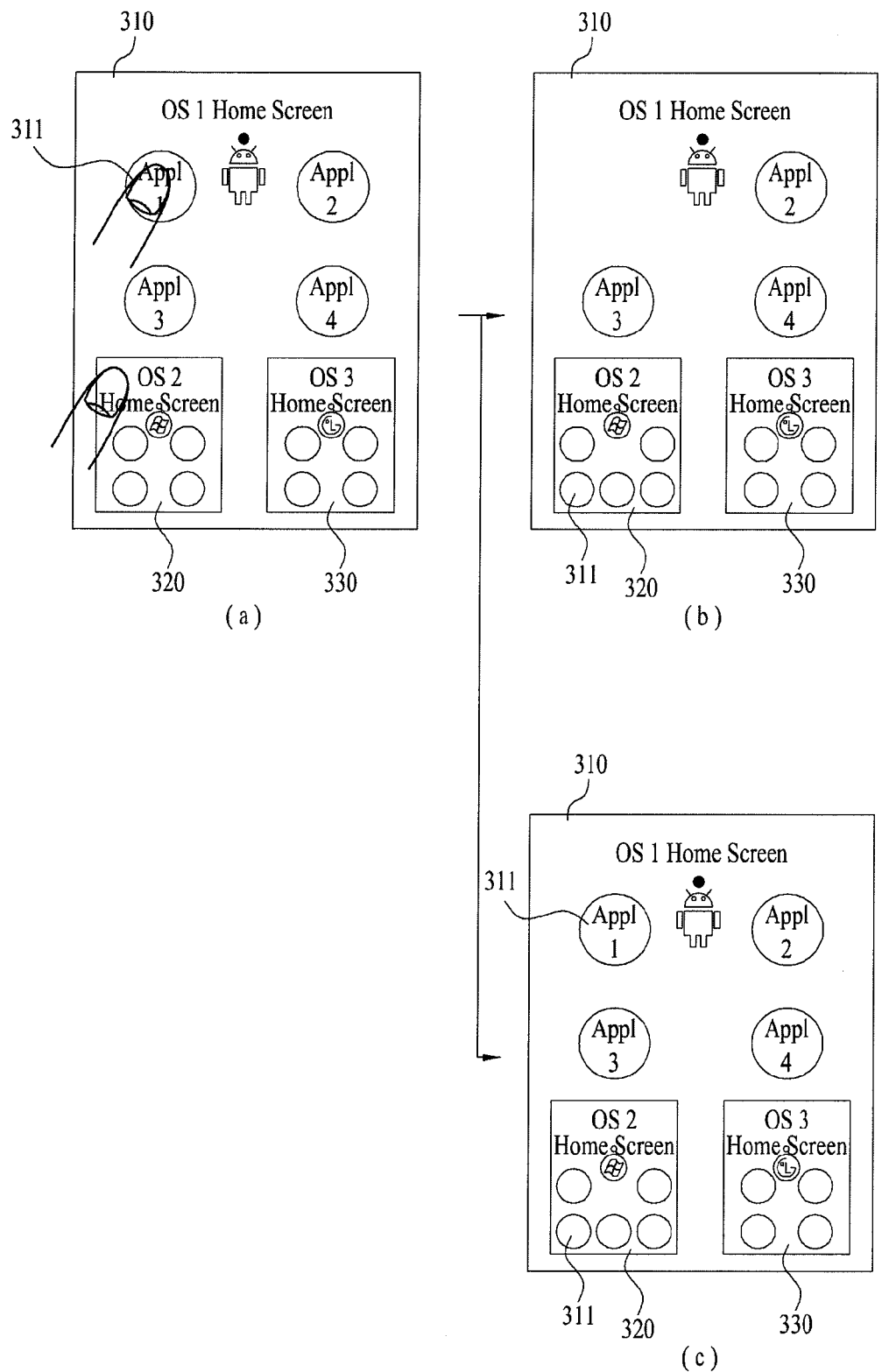
FIG. 26 and FIG. 27 are diagrams of screen configurations of a process for shifting an application of a specific OS dedicated screen among OS dedicated screens displayed together within a screen to another OS dedicated screen according to an embodiment 2-8 of the present invention.
Figure 27:
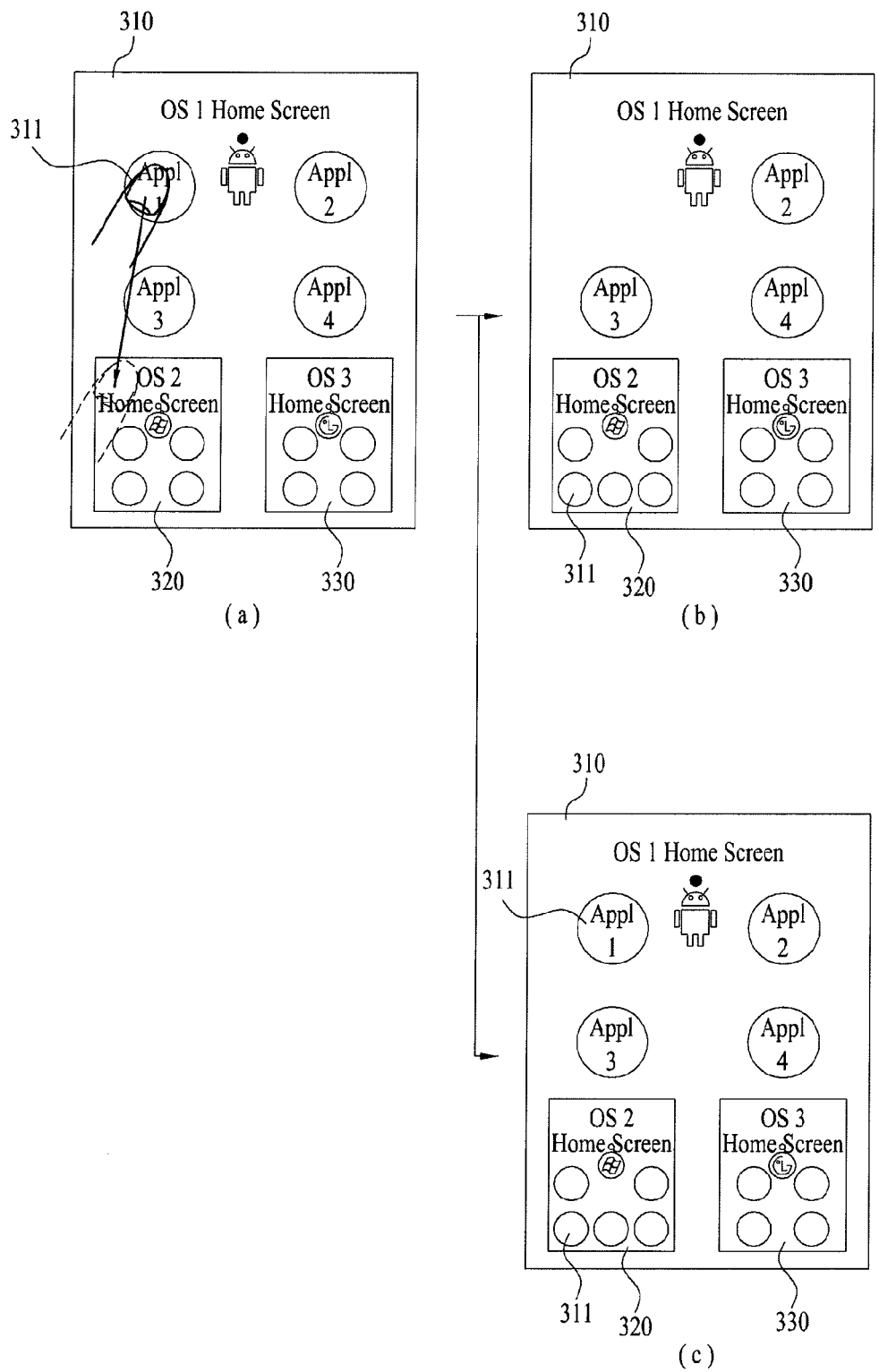

FIG. 26 and FIG. 27 are diagrams of screen configurations of a process for shifting an application of a specific OS dedicated screen among OS dedicated screens displayed together within a screen to another OS dedicated screen according to an embodiment 2-8 of the present invention.

First of all, while the OS dedicated screens 310, 320 and 330 are displayed on a single screen together by the process shown in FIGS. 9 to 16, when a specific application 311 of the first OS dedicated screen 310 is being touched, if the second OS dedicated screen 320 is touched [FIG. 26 (a)], the controller 180 shifts the application 311 to the second OS dedicated screen 320 [FIG. 26 (b) and FIG. 26 (c)].

In doing so, referring to FIG. 26 (c), the controller 180 cuts the application 311 from the first OS dedicated screen 310 and is then able to paste the cut application 311 to the second OS dedicated screen 320.

Alternatively, referring to FIG. 26 (c), after the controller has copies the application 311 on the first OS dedicated screen 310, the controller is able to paste the copied application 311 to the second OS dedicated screen 320.

If a specific application 311 of the first OS dedicated screen 310 is dragged & dropped to the second OS dedicated screen 320 [FIG. 27 (a)], the controller 180 shifts the dragged & dropped application 311 into the second OS dedicated screen 320 [FIG. 27 (b), FIG. 27 (c)].

Moreover, if a specific application 321 of the second OS dedicated screen 320 is dragged & dropped to the first OS dedicated screen 310, the controller 180 shifts the dragged & dropped application 321 into the first OS dedicated screen 310.

Embodiment 2-9

Figure 28:
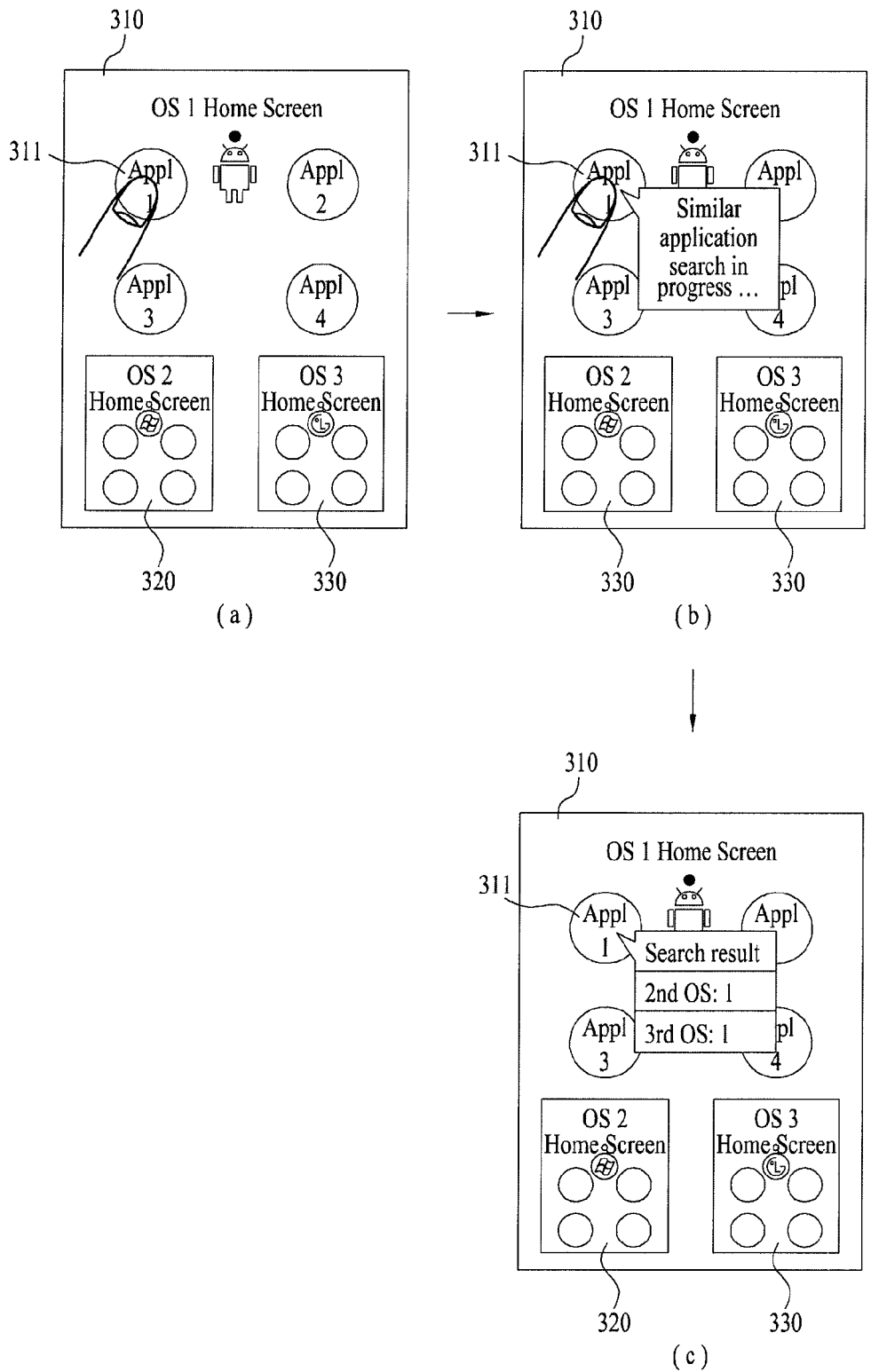
FIG. 28 and FIG. 29 are diagrams of screen configurations of a process for searching and displaying an application, which provides a function similar to that of an application within a specific OS dedicated screen, within a different OS dedicated screen according to an embodiment 2-9 of the present invention.
Figure 29:
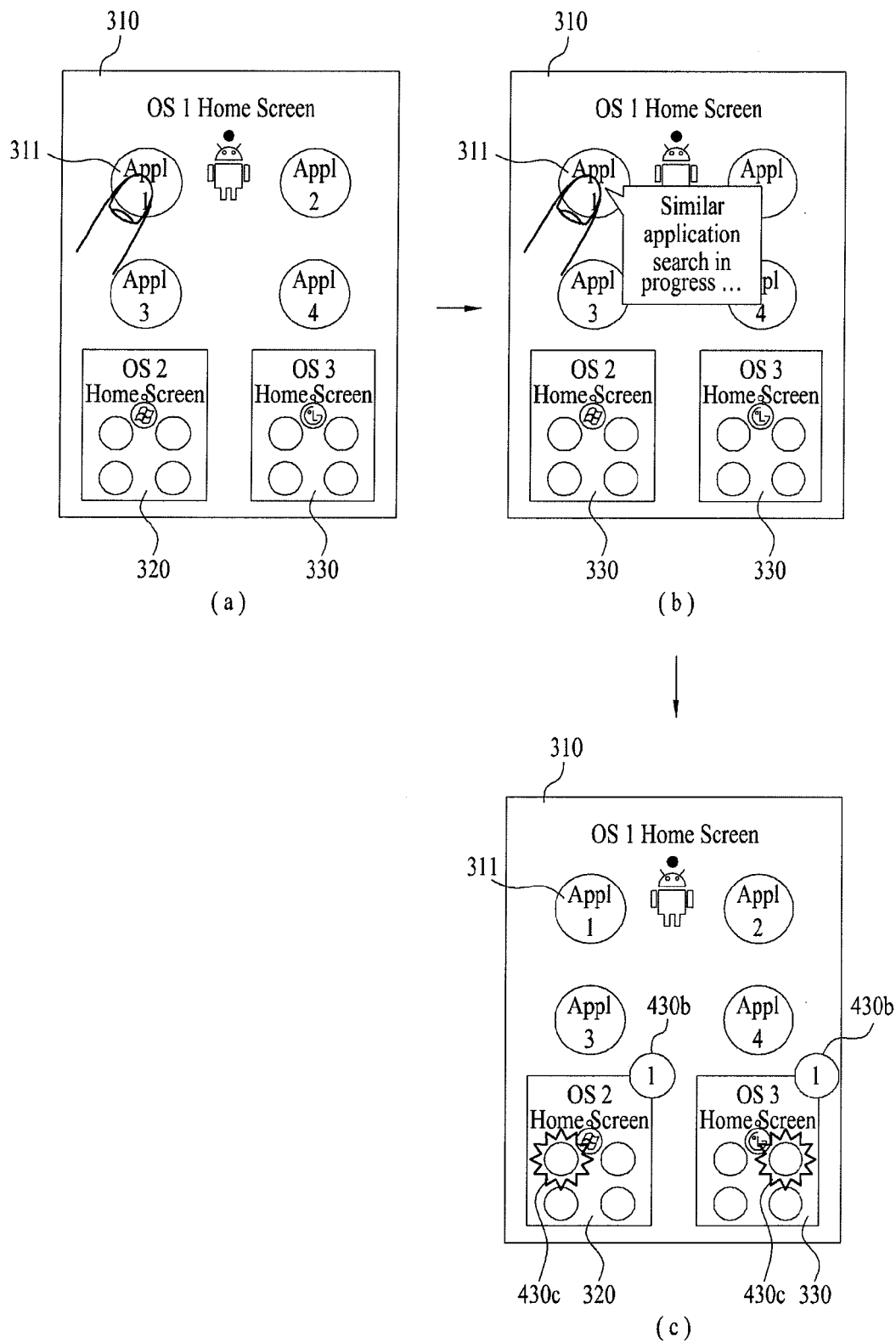

FIG. 28 and FIG. 29 are diagrams of screen configurations of a process for searching and displaying an application, which provides a function similar to that of an application within a specific OS dedicated screen, within a different OS dedicated screen according to an embodiment 2-9 of the present invention.

Referring to FIG. 28 and FIG. 29, if a first application 311 within a specific first OS dedicated screen 310 is selected [FIG. 28 (*a*), FIG. 29 (*a*)], the controller 180 obtains a function of the first application 311, searches second and third OS dedicated screens 320 and 330 except the first OS dedicated screen 310 among the entire OS dedicated screens 310, 320 and 330 for at least one application providing a function equal or similar to that of the obtained first application 31 [FIG. 28 (*b*), FIG. 29 (*b*)], and then displays information indicating the found application [FIG. 28 (*c*), FIG. 29 (*c*)].

In this case, when the controller 180 searches the second and third OS dedicated screens 320 and 330 for the application having the function similar to that of the first application 311, the controller 180 is able to search application belonging to a category of the function of the first application 311. For instance, if the first application 311 is a video play application, it can be observed that the video play belongs to a multimedia category. And, the controller 180 searches applications in the second and third OS dedicated screens 320 and 330 for the application having the function belonging to the multimedia category.

Meanwhile, referring to FIG. 28 (*c*), if the applications having the function equal or similar to that of the selected first application 311 are found from the second and third OS dedicated screens 320 and 330, the controller 180 lists the found applications and is then able to display the application list 430*a* around the first application 311. If a specific application is selected from the application list 430*a*, the controller 180 executes the selected application.

Alternatively, referring to FIG. 29 (*c*), if the applications having the function equal or similar to that of the selected first application 311 are found from the second and third OS dedicated screens 320 and 330, the controller 180 is able to display information 430*b* indicating the search result on each of the corresponding OS dedicated screens 320 and 330.

In this case, the information 430*b* indicating the search result can indicate names of the found applications and the number of the found applications.

Moreover, referring to FIG. 29 (*c*), if the applications having the function equal or similar to that of the selected first application 311 are found from the second and third OS dedicated screens 320 and 330, the controller 180 enables a user to identify the found applications in a manner that the found applications are displayed in the corresponding OS dedicated screens 320 and 330 by being represented with emphases 430*c*.

If a prescribed one of the applications represented as the emphases 430*c* is selected from the second and third OS dedicated screens 320 and 330, the controller 180 obtains whether a corresponding operating system of the selected application is driven. If the corresponding operating system is not driven, the controller 180 drives the corresponding operating system to execute the selected application.

Besides, if the application having the function equal or similar to that of the selected first application 311 is not found from the second and third OS dedicated screens 320 and 330, the controller 180 accesses a web for providing an application download via the wireless communication unit 110, searches the accessed web for an application having a function equal or similar to that of the first application 311, and then displays the found application [not shown in FIG. 28 or FIG. 29].

Embodiment 2-10

FIGS. 30 to 35 are diagrams of screen configurations of a process for controlling an operation of a specific one of OS dedicated screens displayed together within a single screen according to an embodiment 2-10 of the present invention.

First of all, while the OS dedicated screens 310, 320 and 330 are displayed on a single screen together by the process shown in FIGS. 9 to 16, if a specific second OS dedicated screen 320 is selected [FIG. 30 (*a*)], the controller 180 displays a menu list 440 for controlling operations related to the selected second OS dedicated screen 320 by at least one scheme.

In this case, the menu list 440 can include at least one of a first menu 441 for deleting the selected second OS dedicated screen 320, a second menu 442 for deleting applications within the second OS dedicated screen 320, a third menu 443 for driving on/off of a second operating system dedicated to the second OS dedicated screen 320, a fourth menu 444 for changing a display configuration setting of the second OS dedicated screen 320 and a fifth menu 445 for adding a new application to the second OS dedicated screen 320.

In particular, if the first menu 441 is selected from the menu list 440 [FIG. 31 (*a*)], the controller 180 deletes the second home screen 320 [FIG. 31 (*b*)].

Figure 32:
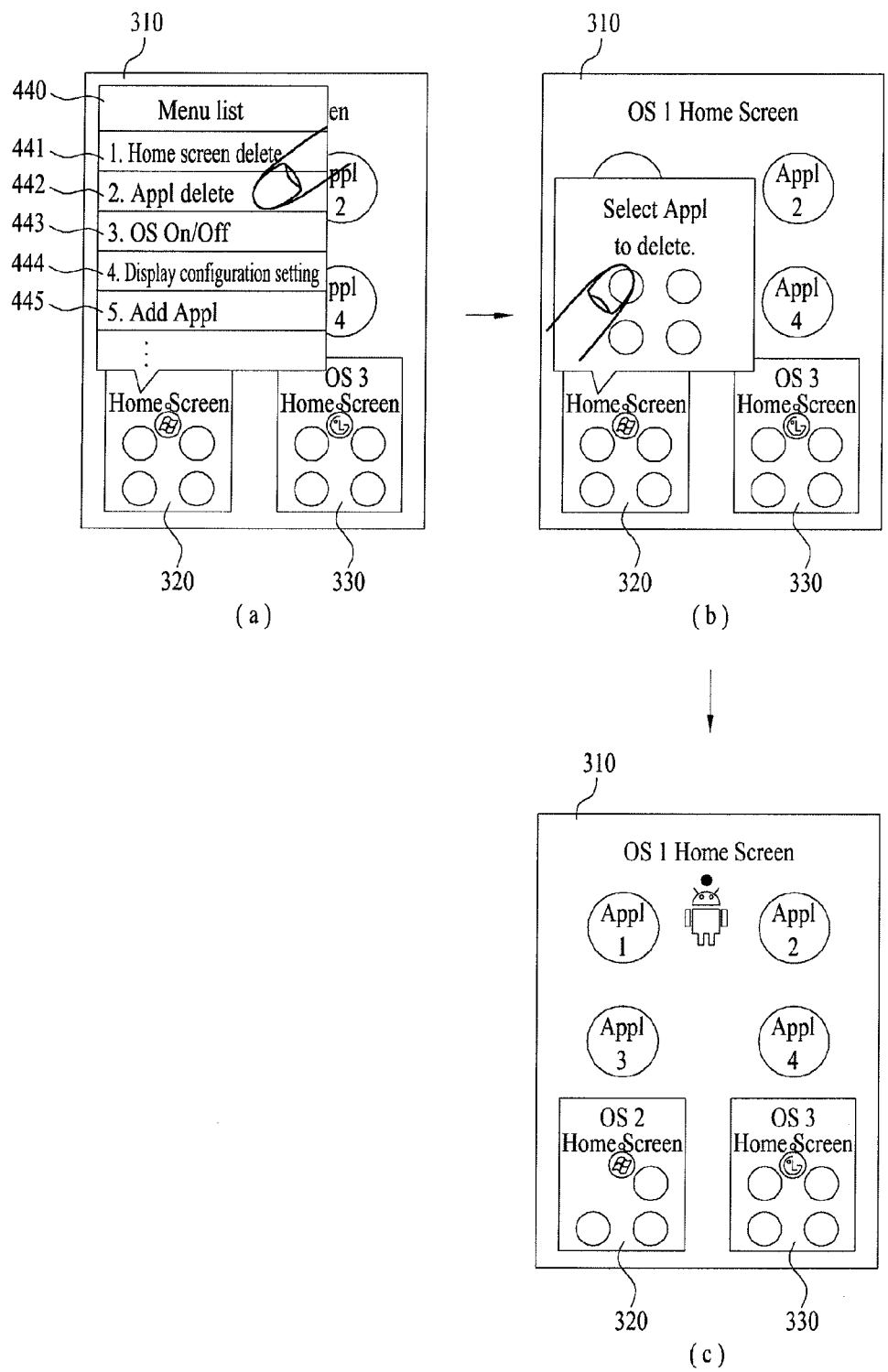

If the second menu 442 is selected from the menu list 440 [FIG. 32 (*a*)], the controller 180 displays a list of the applications within the second OS dedicated screen 320 [FIG. 32 (*b*)]. If an application to delete is selected from the list, referring to FIG. 32 (*c*), the controller 180 deletes the selected application from the second OS dedicated screen 320.

Figure 33:
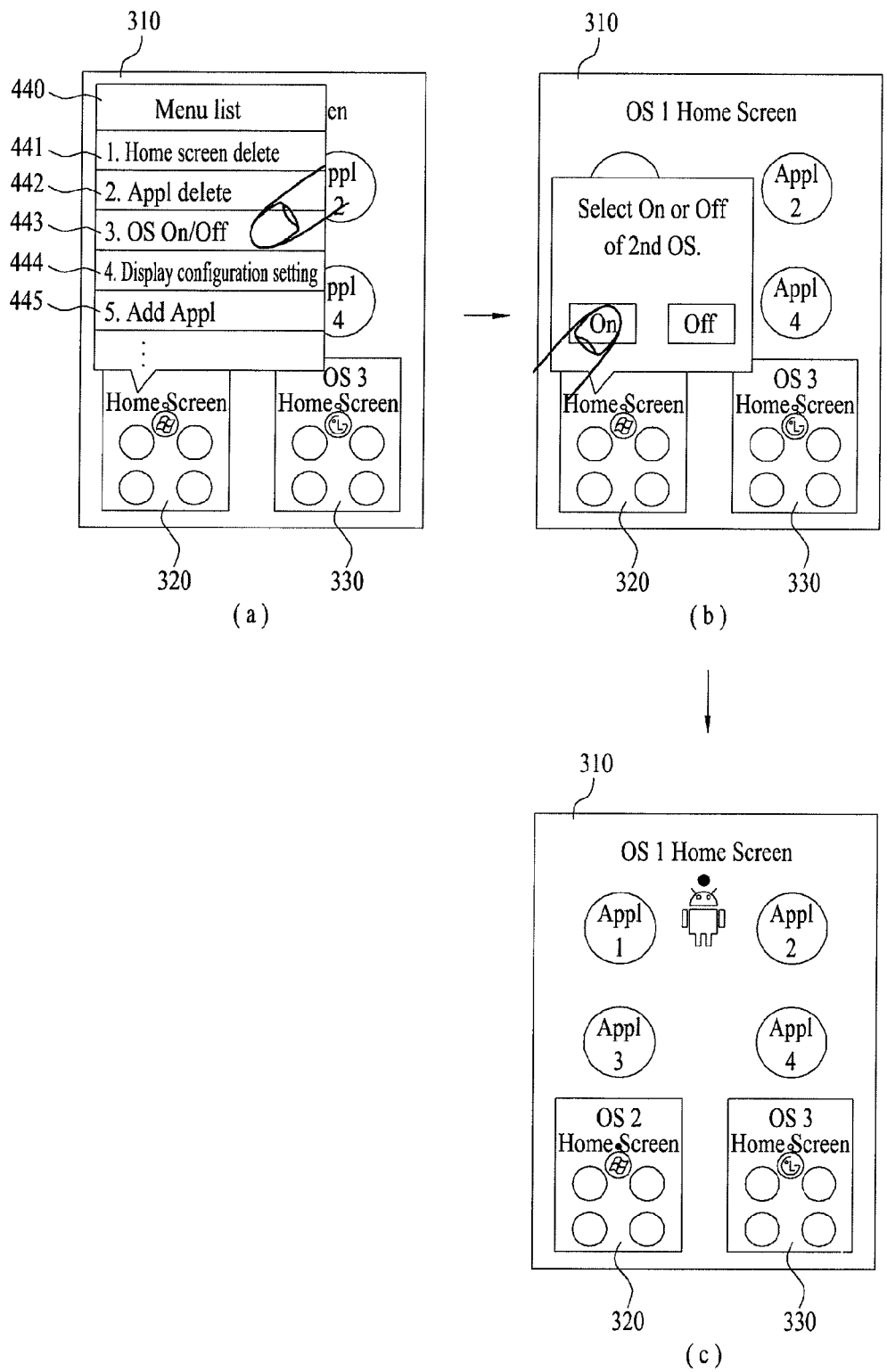

If the third menu 443 is selected from the menu list 440 [FIG. 33 (*a*)], the controller displays a driving setting window for setting a presence or non-presence of the driving of the second operating system dedicated to the second OS dedicated screen 320 [FIG. 33 (*b*)]. If the driving-off of the second operating system is set via the driving setting window, referring to FIG. 33 (*c*), the controller 180 turns off the driving of the second operating system.

Figure 34:
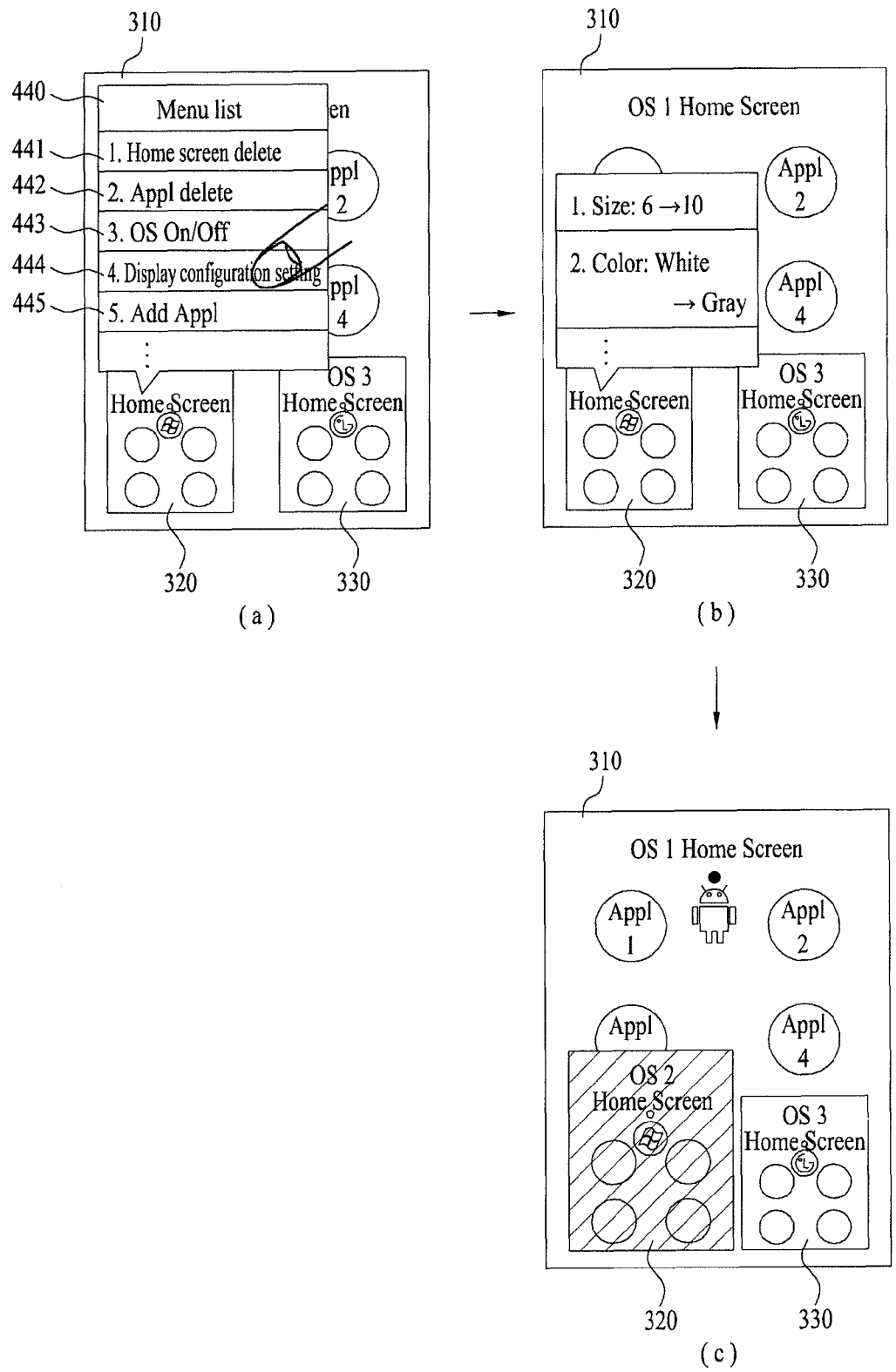

If the fourth menu 444 is selected from the menu list 440 [FIG. 34 (*a*)], the controller displays a configuration setting window for a display configuration setting of the second OS dedicated screen 320. If the display configuration of the second OS dedicated screen 320 is set via the configuration setting window, referring to FIG. 34 (*c*), the controller 180 applies the set display configuration to the second OS dedicated screen 320.

In this case, the display configuration can include a display size, display color, zoom-in/zoom-out and the like of the second OS dedicated screen 320. For instance, FIG. 34 shows that the display color and size of the second OS dedicated screen 320 are modified.

Figure 35:
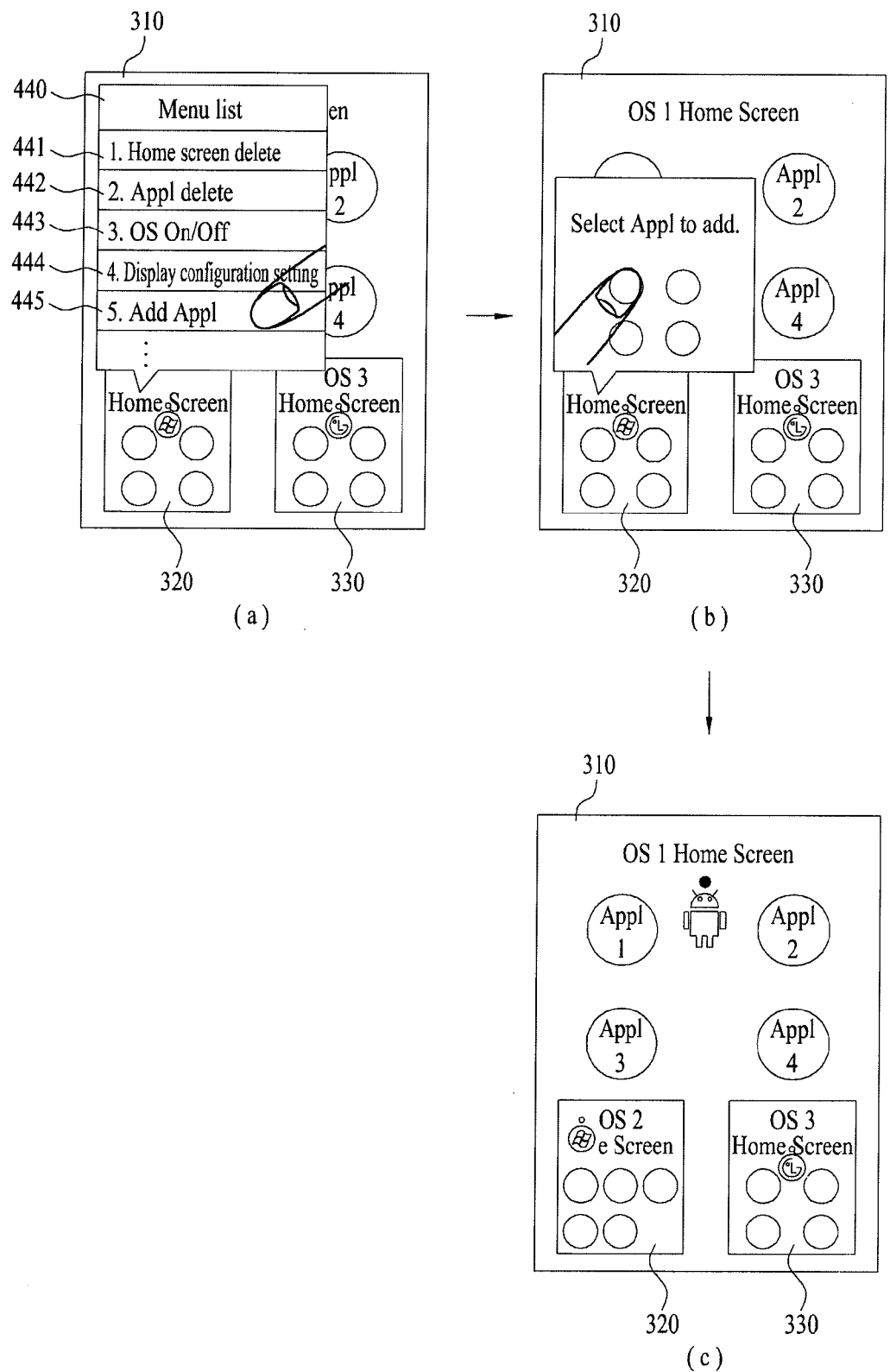

If the fifth menu 445 is selected from the menu list 440 [FIG. 35 (*a*)], the controller 180 displays a list of applications provided to the memory 160 [FIG. 35 (*b*)]. If an application to add newly is selected from the list, referring to FIG. 35 (*c*), the controller 180 newly adds the selected application to the second OS dedicated screen 320.

In the above description of the second embodiment of the present invention with reference to FIGS. 9 to 35, screens dedicated to all operating systems are displayed on a single screen together. And, operations of the OS dedicated screens displayed together are controlled.

Accordingly, the present invention provides the following effects and/or advantages.

First of all, the present invention facilitates a user to view screens in a manner of switching the screens (e.g., home screens, etc.), which are respectively dedicated to operating systems, to one another using such a touch as a flicking and the like.

Secondly, the present invention enables screens dedicated to operating systems loaded on a mobile terminal to be displayed within a single screen, thereby facilitating a user to use applications included in the dedicated screen of each of the operating systems within the single screen.

It will be apparent to those skilled in the art that various modifications and variations can be specified into other forms without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a memory including at least first and second OSs (Operating Systems) and applications dedicated to each of the first and second OSs;
   a display unit configured to display a first OS (Operating System) dedicated screen including the applications dedicated to the first OS among the first and second OSs; and
   a controller configured to switch the displaying of the first OS dedicated screen having a first OS indicator to a displaying of a second OS dedicated screen having a second OS indicator by deactivating the first OS dedicated screen and activating the second OS dedicated screen while the first and second OSs are simultaneously driven, if a switching command for switching the first OS dedicated screen to the second OS dedicated screen is input,
   wherein the second OS is only being driven on the mobile terminal when the switching command is input and the controller switches the first OS dedicated screen to the second OS dedicated screen,
   wherein the switching command includes a flicking touch action having a specific direction, and the controller is further configured to switch displaying the first OS dedicated screen to displaying the second OS dedicated screen when the flicking touch action has a direction from left to right on the display unit,
   wherein if a specific application is selected from the first OS dedicated screen, the controller searches the second OS dedicated screen for at least one application providing a function equal or similar to that of the selected specific application, and the controller controls the display unit to display information of the found at least one application in a list in the first OS dedicated screen, or to display the found at least one application in a manner that the found application can be identified in the corresponding second OS dedicated screen by being represented with emphases, and
   wherein if no application providing a function equal or similar to that of the specific application is found from the second OS dedicated screen, the controller controls the access to a web to search for an application having a function equal or similar to that of the selected specific application.

2. The mobile terminal of claim 1, wherein the controller is further configured to control the display unit to display first and second information indicating the first and second OSs are included in the mobile terminal and to highlight one of the first and second information to indicate which one of the first and second OSs is currently being driven.

3. The mobile terminal of claim 1, wherein if a command is input requesting all of the OSs dedicated screens be displayed together on the display unit while the first OS dedicated screen is being displayed, the controller is further configured to display the second OS dedicated screen that is not currently being displayed together with the first OS dedicated screen.

4. The mobile terminal of claim 3, wherein the controller is further configured to display the first OS dedicated screen as a main screen and to display the second dedicated OS screen as a subscreen.

5. The mobile terminal of claim 4, wherein if the second OS dedicated screen is selected, the controller is further configured to display the selected second OS dedicated screen as the main screen and to display the first OS dedicated screen as the subscreen.

6. The mobile terminal of claim 3, wherein if an execution command for a specific application within one of the first and second OSs dedicated screens is input, the controller is further configured to execute the specific application.

7. The mobile terminal of claim 6, wherein the controller is further configured to display information corresponding to the executed specific application within said one of the first and second OSs dedicated screens or to display the information corresponding to the executed specific application as a full screen on the display unit.

8. The mobile terminal of claim 3, wherein if a command for shifting a specific application within the first OS dedicated screen to the second OS dedicated screen is input, the controller is further configured to shift the application into the second OS dedicated screen.

9. A method of a mobile terminal including at least first and second OSs (Operating Systems) and applications dedicated to each of the first and second OSs, the method comprising:
   displaying, on a display unit of the mobile terminal, a first OS (Operating System) dedicated screen including the applications dedicated to the first OS among the first and second OSs; and
   switching, via a controller on the mobile terminal, the displaying of the first OS dedicated screen to a displaying of a second OS dedicated screen by deactivating the first OS dedicated screen having a first OS indicator and activating the second OS dedicated screen having a second OS indicator while the first and second OSs are simultaneously driven, if a switching command for switching the first OS dedicated screen to the second OS dedicated screen is input, wherein the first OS is only being driven on the mobile terminal when the switching command is input and the controller switches the first OS dedicated screen to the second OS dedicated screen, wherein the switching command includes a flicking touch action having a specific direction, and the switching step switches displaying the first OS dedicated screen to displaying the second OS dedicated screen when the flicking touch action has a direction from left to right on the display units, wherein if a specific application is selected from the first OS dedicated screen, the method further comprises searching the second OS dedicated screen for at least one application providing a function equal or similar to that of the selected specific application, and displaying information of the found at least one application in a list in the first OS dedicated screen, or displaying the found at least one application in a manner that the found application can be identified in the corresponding second OS dedicated screen by being represented with emphases, and wherein if no application providing a function equal or similar to that of the specific application is found from the second OS dedicated screen, the method further comprises accessing a web to search for an application having a function equal or similar to that of the selected specific application.

10. The method of claim 9, further comprising:

displaying first and second information indicating the first and second OSs are included in the mobile terminal; and highlighting one of the first and second information to indicate which one of the first and second OSs is currently being driven.

11. The method of claim 9, wherein if a command is input requesting all of the OSs dedicated screens be displayed together on the display unit while the first OS dedicated screen is being displayed, the method further comprises displaying the second OS dedicated screen that is not currently being displayed together with the first OS dedicated screen.

12. The method of claim 11, further comprising:

displaying the first OS dedicated screen as a main screen and displaying the second dedicated OS screen as a subscreen.

13. The method of claim 12, wherein if the second OS dedicated screen is selected, the method further comprises displaying the selected second OS dedicated screen as the main screen and displaying the first OS dedicated screen as the subscreen.

14. The method of claim 11, wherein if an execution command for a specific application within one of the first and second OSs dedicated screens is input, the method further comprises executing the specific application.

15. The method of claim 14, wherein the method further comprises displaying information corresponding to the executed specific application within said one of the first and second OSs dedicated screens or displaying the information corresponding to the executed specific application as a full screen on the display unit.

16. The method of claim 11, wherein if a command for shifting a specific application within the first OS dedicated screen to the second OS dedicated screen is input, the method further comprises shifting the application into the second OS dedicated screen.

17. The mobile terminal of claim 1, wherein the controller is further configured to:

in response to a user command, generate a new OS dedicated screen by using the first OS dedicated screen and the second OS dedicated screen.

\* \* \* \* \*